United States Patent [19]
Murphy

[11] 3,999,933
[45] Dec. 28, 1976

[54] BURNER CONTROL SYSTEM
[75] Inventor: Ray Murphy, Irving, Tex.
[73] Assignee: Forney Engineering Company, Carrollton, Tex.
[22] Filed: May 15, 1975
[21] Appl. No.: 578,054

Related U.S. Application Data
[63] Continuation of Ser. No. 451,716, March 15, 1974, abandoned.

[52] U.S. Cl. ............................ 431/15; 431/18; 431/29; 431/31
[51] Int. Cl.² .................................... F23N 5/21
[58] Field of Search .............. 431/14, 15, 16, 18, 431/24, 25, 26, 29, 30, 31; 122/448 R

[56] References Cited
UNITED STATES PATENTS

| | | | |
|---|---|---|---|
| 3,051,227 | 8/1962 | Robson | 431/30 |
| 3,232,332 | 2/1966 | Schuss et al. | 431/29 |
| 3,279,521 | 10/1966 | Munson et al. | 431/30 |
| 3,310,096 | 3/1967 | De Livuis | 431/30 |
| 3,324,927 | 6/1967 | Staring | 431/31 |
| 3,684,423 | 8/1972 | Bryant | 431/24 |
| 3,715,180 | 2/1973 | Cordell | 431/31 |
| 3,781,161 | 12/1973 | Schuss | 431/26 |

FOREIGN PATENTS OR APPLICATIONS

| | | | |
|---|---|---|---|
| 893,251 | 4/1962 | United Kingdom | 122/448 R |

*Primary Examiner*—Edward G. Favors
*Attorney, Agent, or Firm*—Marvin A. Naigur; John E. Wilson

[57] ABSTRACT

There has been provided a burner control system including apparatus adapted for controlling fuel burner systems for firing furnace sections of steam generators in accordance with any one of a plurality of predetermined subsystem specifications such as fuel safety, ignition and shutdown sequences. The system includes a plurality of sets of logical function means (LFM) having inputs and outputs, responsive to selected ones of the parameters of the system for producing output control and indication signals respectively. Each LFM comprises one solid state control circuit card for performing each logical function in accordance with the specification such as fuel trip, burner ignition and shutdown etc. Each control circuit card is fabricated to include functional logic circuits of the AND, OR, NAND, NOR, etc., type adapted to perform each of the various individual logic steps relating to standardized logic sequences associated with fuel burner systems, when each of said LFM is selectively interconnected with other ones in the burner system. The system provides multiple functional card interchangeability in accordance with the selected interconnections thereby being capable of controlling burner systems of a general type which include standardized logic sequences and also specific logic sequence requirements peculiar to the particular system.

31 Claims, 17 Drawing Figures

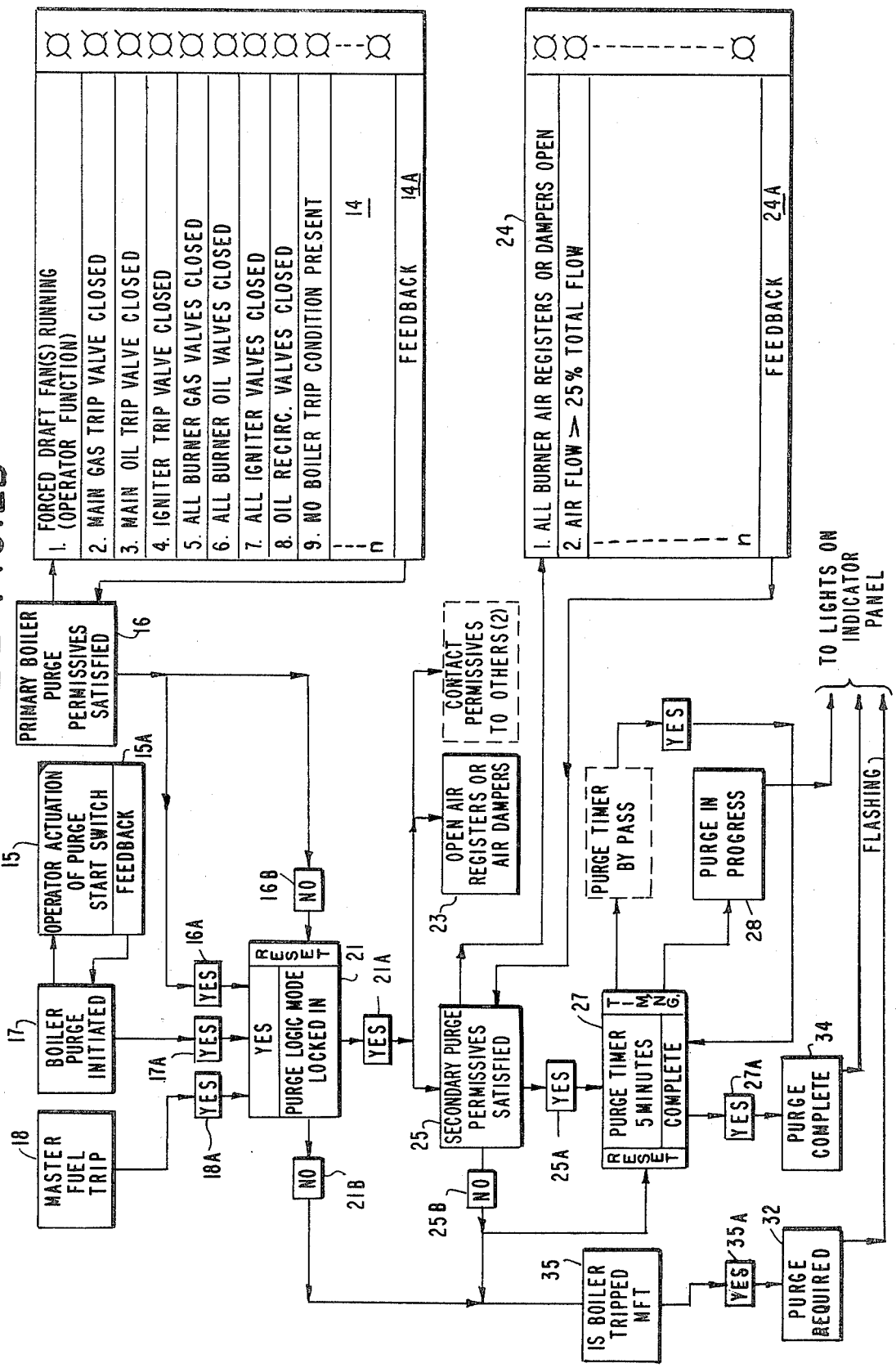

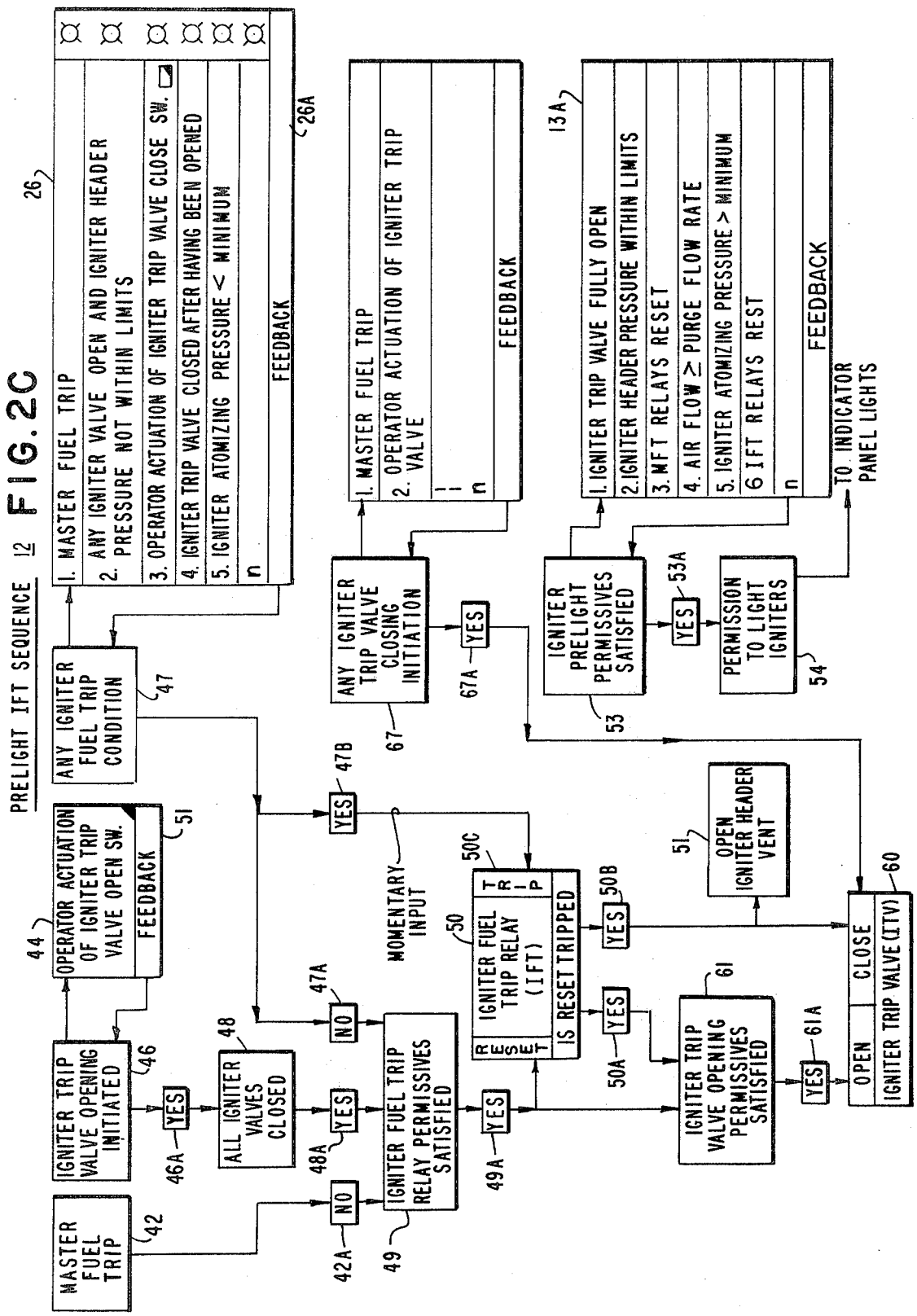

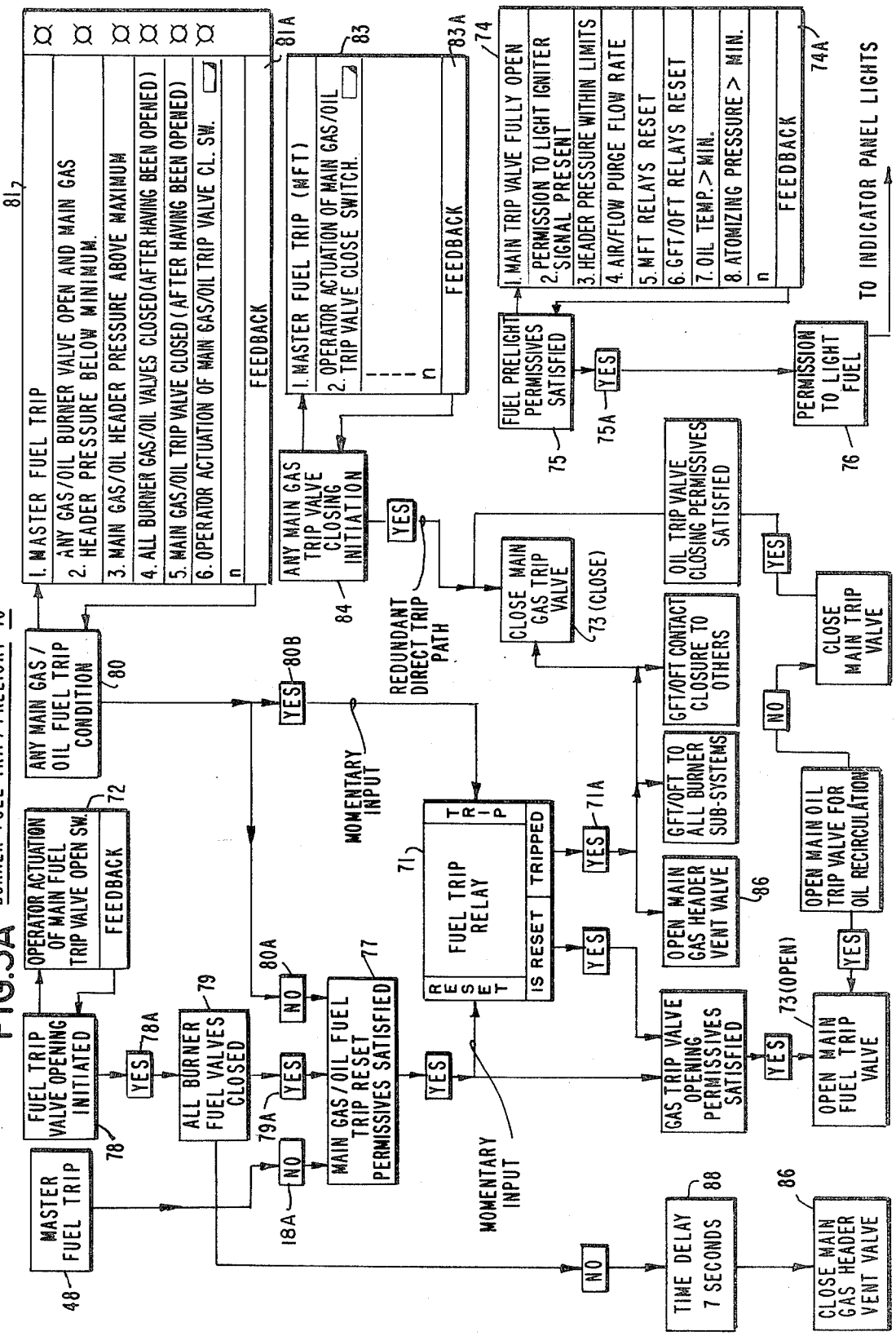

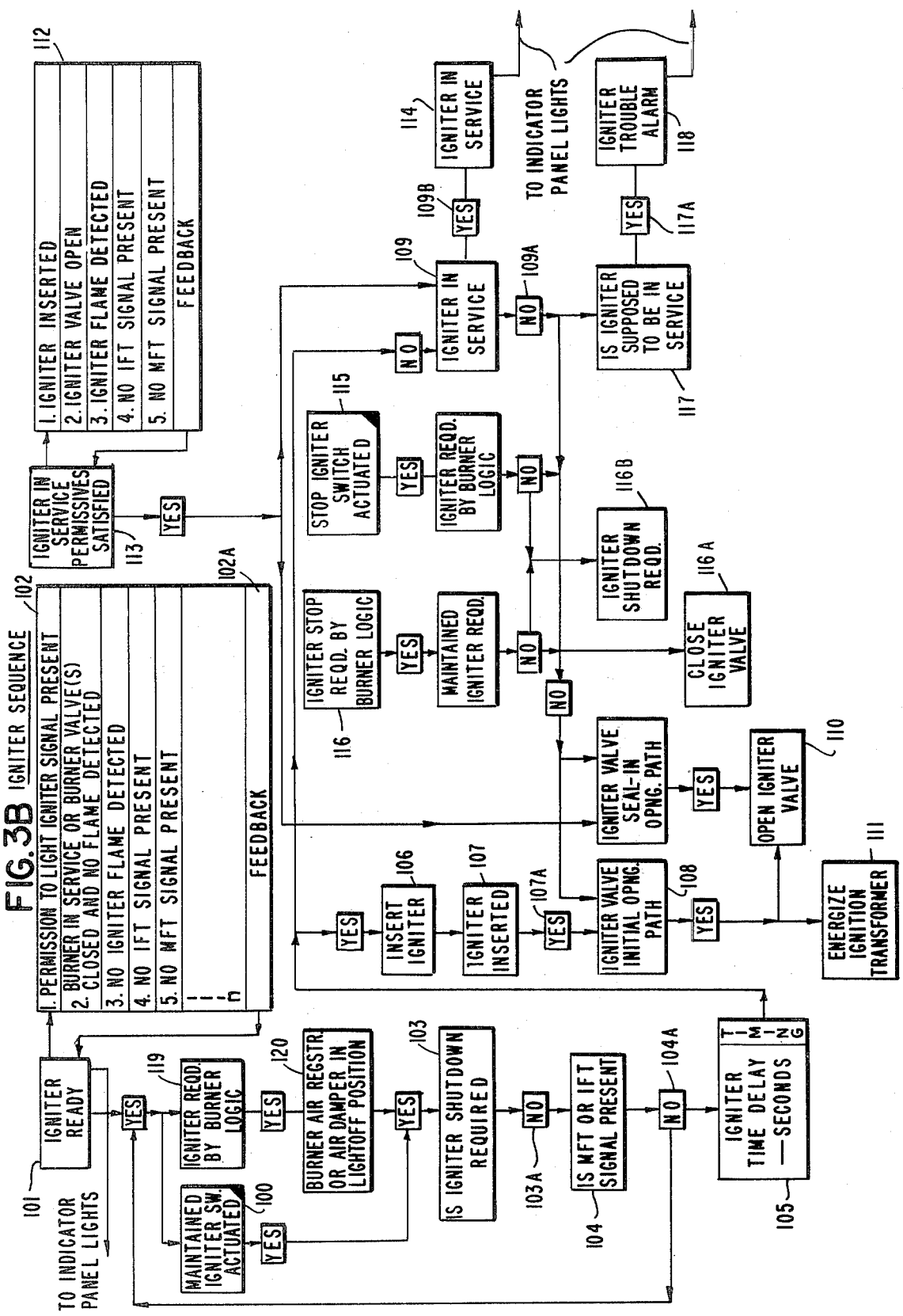

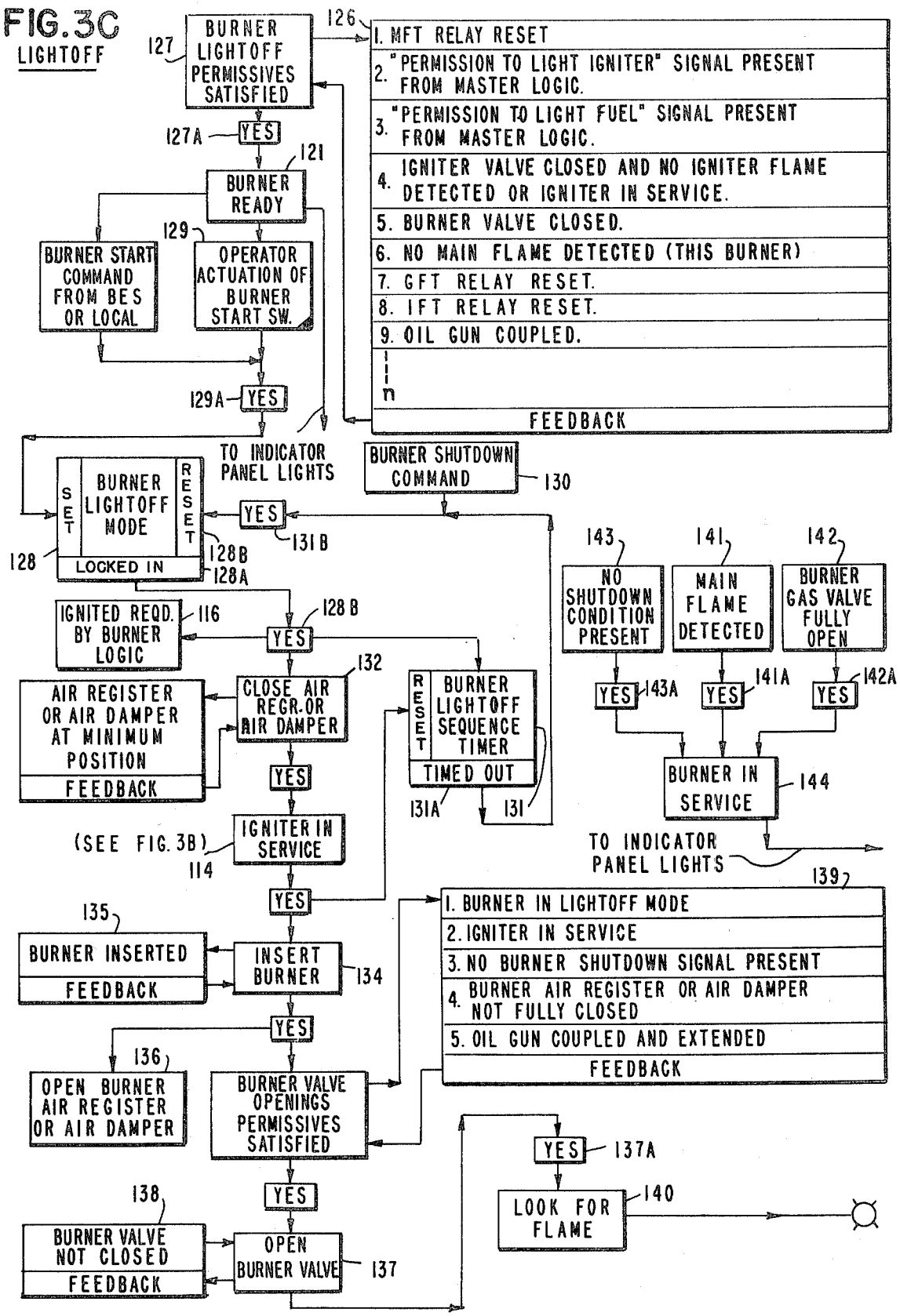

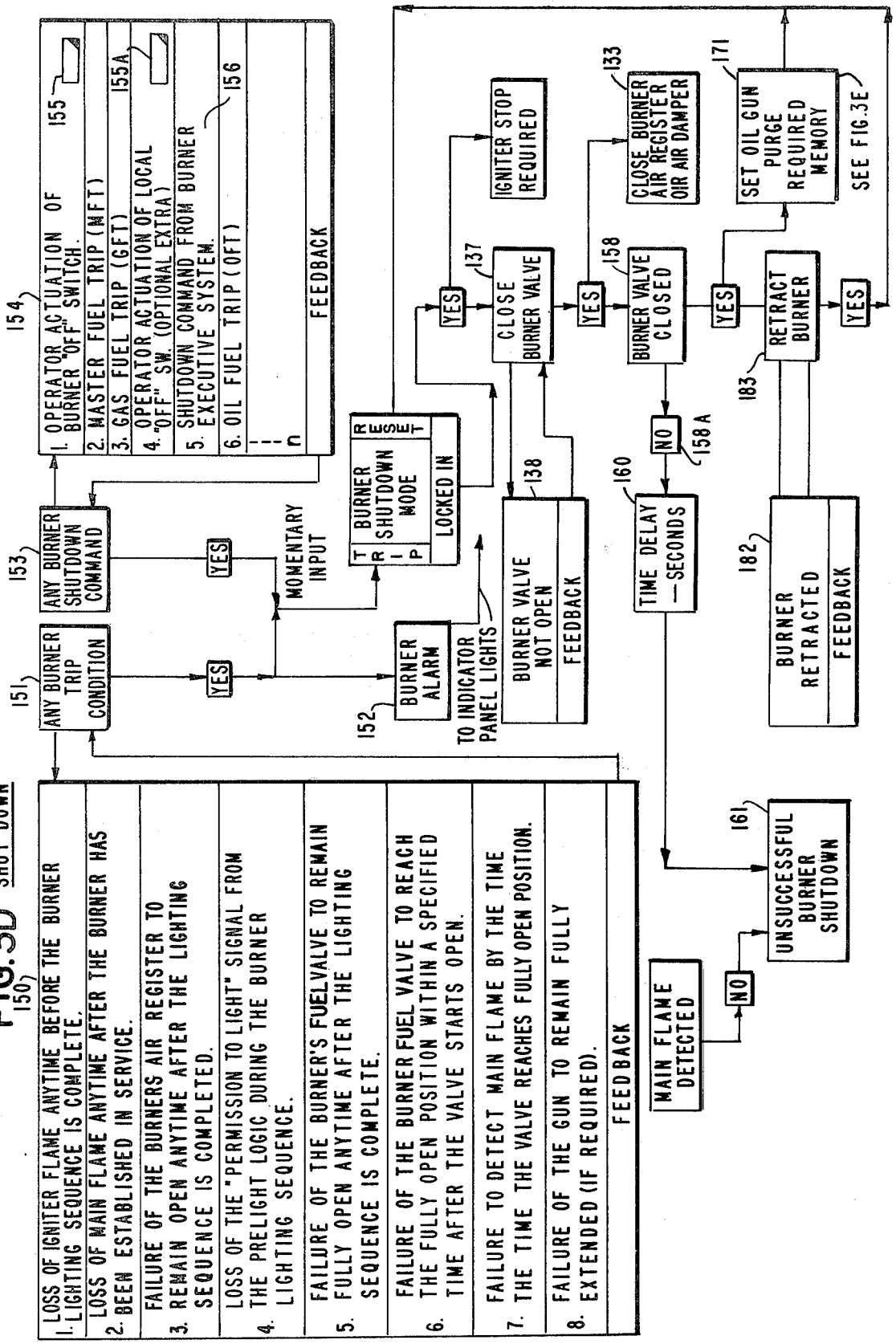

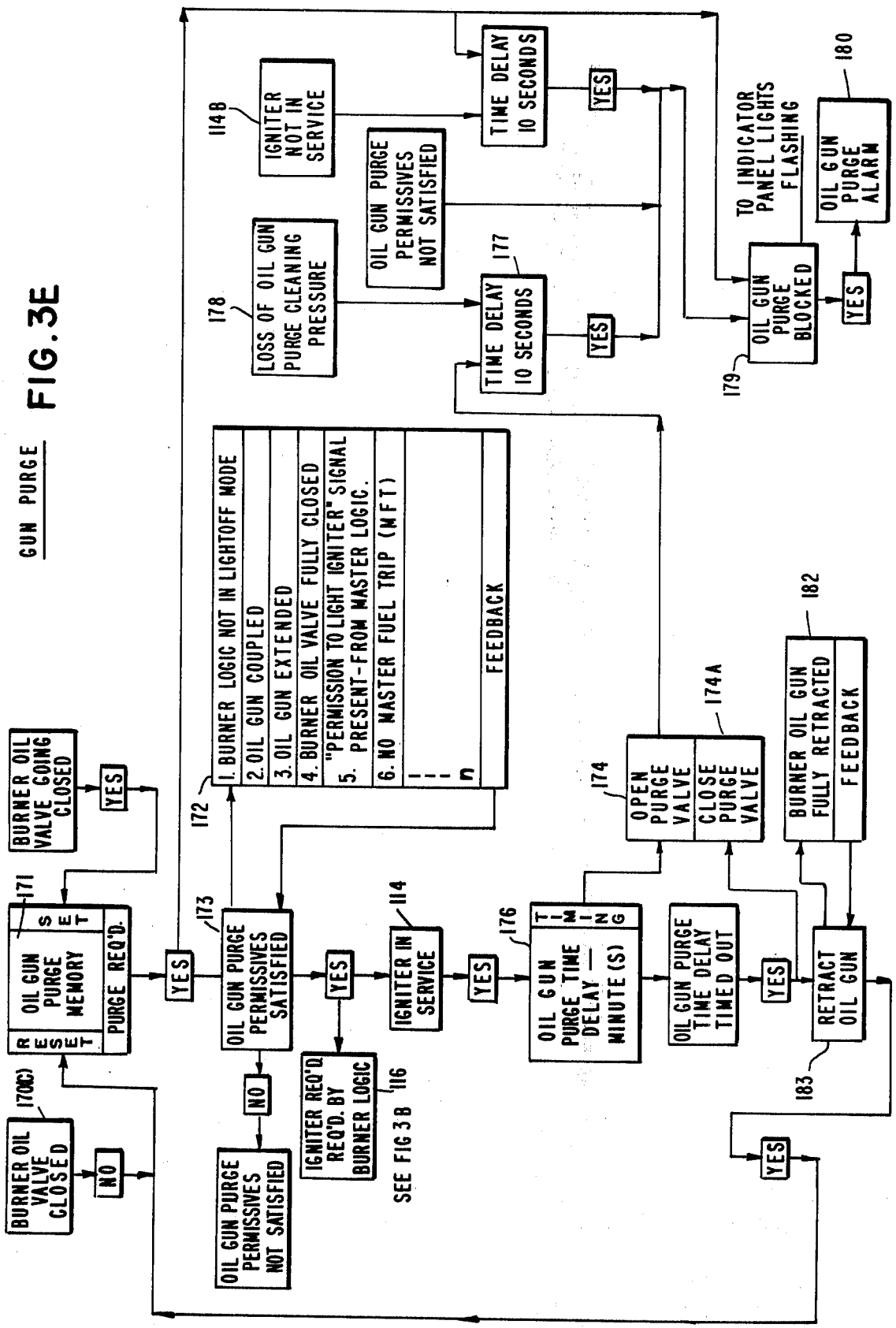

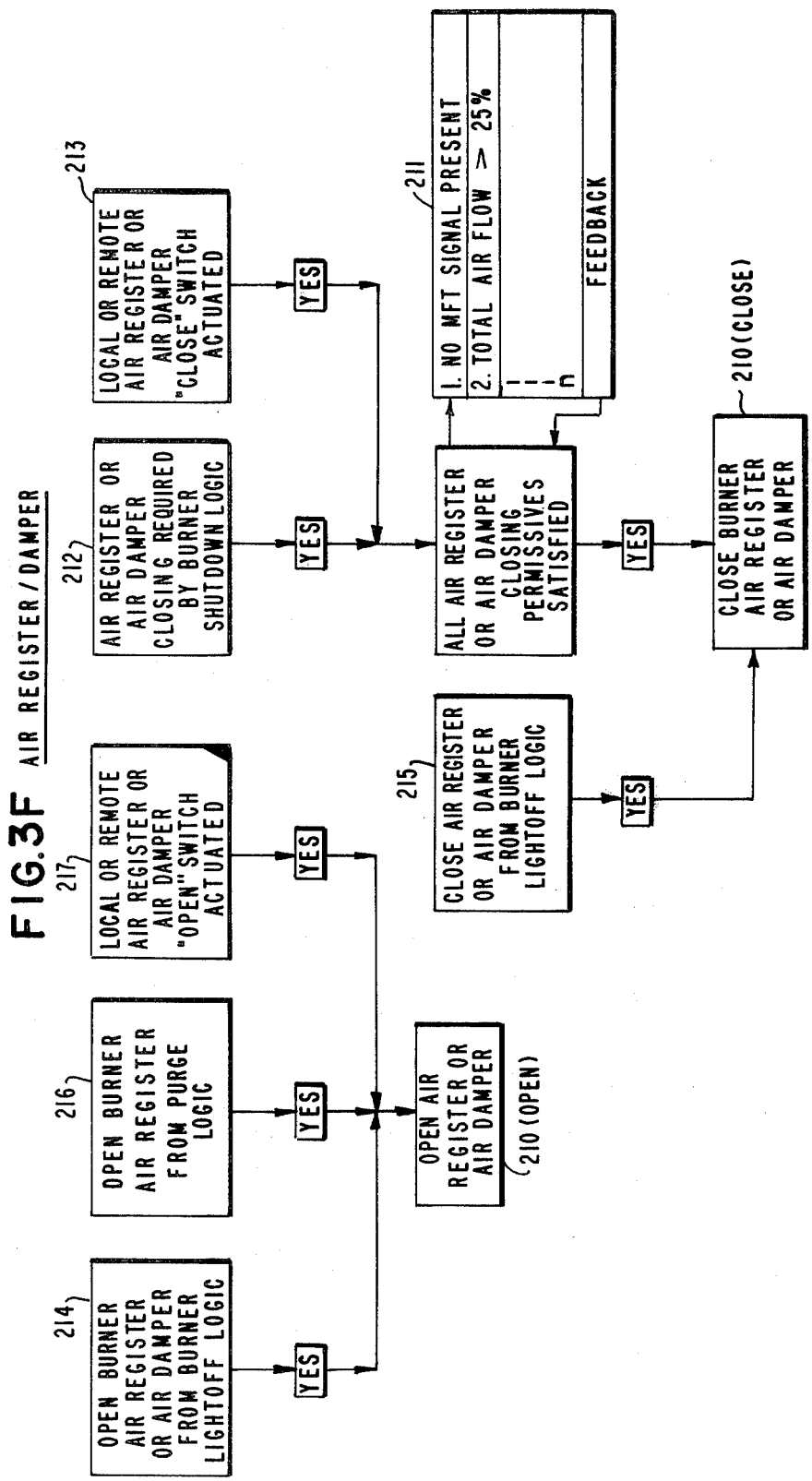

OIL RECIRCULATION

FUEL SAFETY LFM

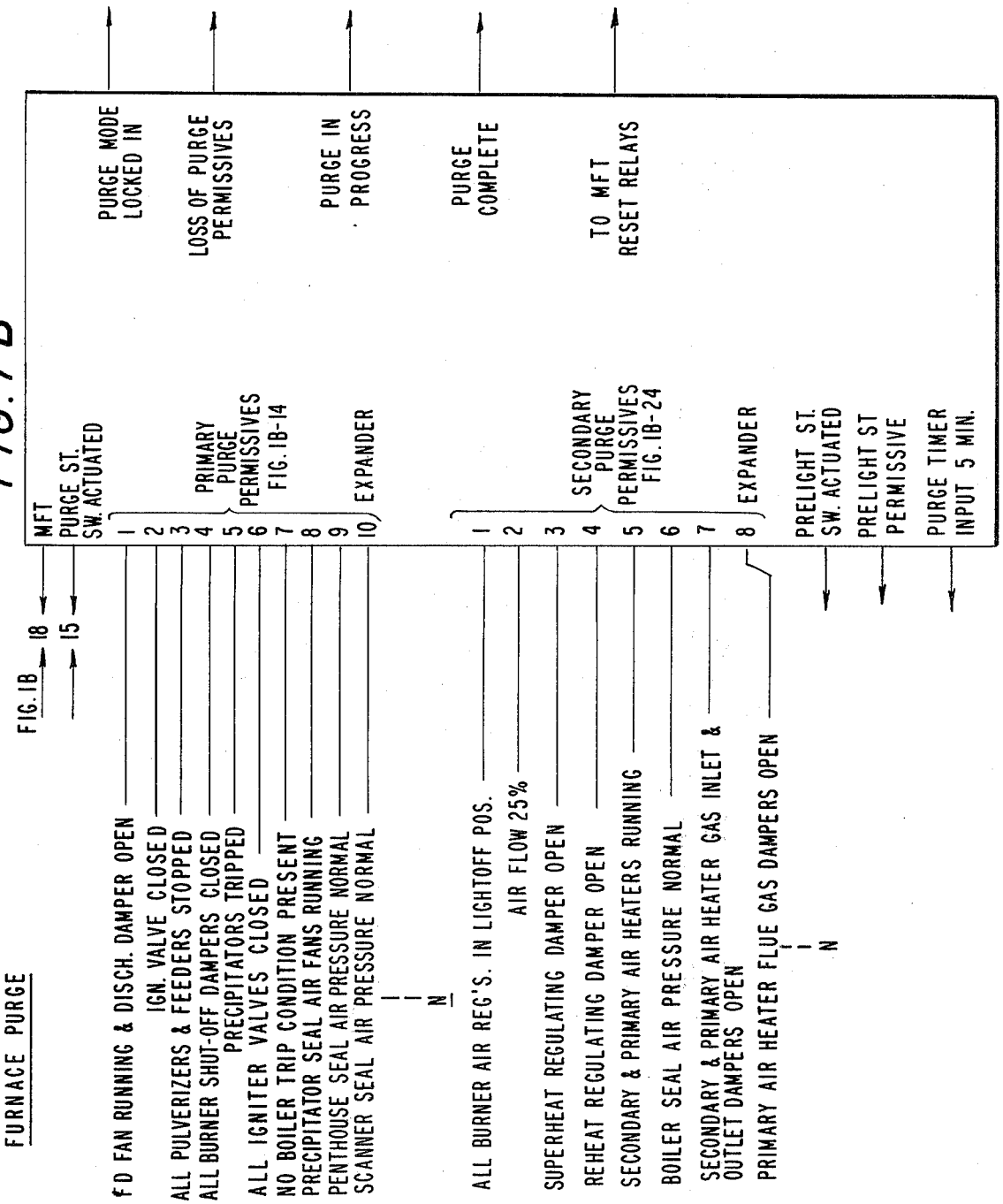

BURNER CONTROL SYSTEM

CROSS-REFERENCE TO RELATED APPLICATION

This is a continuation of applicant's copending U.S. Pat. application Ser. No.451,716, filed on Mar. 15, 1974 now abandoned.

BACKGROUND OF THE INVENTION

The present invention relates to control systems for boiler burner apparatus and more specifically to a control system which is adaptable for controlling any one of a plurality of burner systems in accordance with a specification unique to the particular system.

The design approach to burner control systems currently manufactured is to develop a logic scheme in accordance with a specification provided by a customer, usually a utility company, in need of a control system for assuring the safe and reliable operation of the boiler installation. Many of the specifications are standardized in terms of the safety requirements and certain operating sequences. However, there are enough variations from one boiler installation to another to require, for all practical purposes, a custom design for each control system put into service.

The design engineer, responsible for the fabrication of the system, typically must convert the specification into a series of logic sequences and thereafter convert the logic sequences into a series of interrelated circuits utilizing functional logic devices to effect the final design. In addition, the typical system requires a considerable amount of documentation in keeping with engineering practice. For a typical twelve burner system, the engineering and documentation requirements become very costly, which costs seem unwarranted and unjustified in terms of the repetitiveness and tedium associated with such designs.

Control systems of the type mentioned above, in addition to requiring a great deal of design time, also require an inordinate fabrication time, since a major portion thereof must be handwired using color-coded wiring harnesses and hand soldering for most of the connections. Each of these connections must thereafter be checked not only during the manufacturing stage but also in numerous test runs, in order to assure that the burner control system operates in the manner intended, is reliable, and very importantly meets the safety requirements which are critical.

In order to conserve space and reduce the manufacturing time, many control systems now utilize solid state printed circuit boards, grouped together in a housing, having drawers or bays therein, each bay associated with one burner. Disposed within the bays, there is typically a rack of connectors into which the printed circuit boards are inserted. In such a system, there may be as many as a hundred printed circuit boards for each burner with a multiplicity of cross-connections between cards and connections to other devices.

Feedback signals provide indications as to the status of externally operated devices and these signals are communicated to the different portions of the control system to affect the complex control of the burner system under consideration.

In the present invention, the control system or sub-system, as a whole, is not thought of as one overall unit; but, rather, as a multiple number of sub-units, each having absolute responsibility over its particular function.

This is a departure from past industry applications of digital logic control systems, wherein the overall control system or sub-system has been comprised of a multiple number of cards which, in themselves, did not have absolute control of a piece of hardware, i.e., control of equipment, such as an Ignitor Lighting Sequence, may have encompassed logic gates that were spread over several cards, and intermixed on these cards with logic gates associated with control of other equipment.

A logical functional card on the other hand takes all of this intermixed or distributed logic and lumps it on one card which then has a designated purpose or function. In addition, logic has been placed on the logical functional card to provide it with flexibility enough to handle any logic sequence associated with the designated purpose or function of that respective card which may vary from one burner system specification to another.

By selective interconnection of various designated logical function cards, one ends up with a completely customized system that will control the overall system or sub-system as a whole.

The concept of the present invention is designed to dramatically reduce the engineering time required to convert the specification into a set of circuit diagrams and the associated documentation thereof. Further, it is clear that fabrication time is substantially reduced since the concept eliminates a great deal of cross-wiring from one card to another.

Each of the great majority of burner control systems generally in use, requires certain functions to be performed in a certain sequence. The sequence may vary from one burner system to another but certain functions seem to be generally required. One such function almost universally required in burner control systems is the purging of the boiler of combustible mixtures of gases before a lightoff of the boiler may be effected. Such purging, for example, requires opening of air vents and the start-up of large fans or blowers which draw fresh air into and through the boiler. The purge sequence can be specified as a sub-system with one function or one logical function of a typical burner control system. Another logical function might be the prelight sequences which check for certain conditions, one of which being the completion of the previously mentioned purge sequence as well as other safety conditions which must be satisfied previous to the initiation of the prelight sequence.

The system concept of the present invention rearranges the manner in which the design approach to a custom boiler control system is effected by taking into account certain universally required functions and thereafter, modifying the arrangement of certain ones of these functions for the specific application involved. If the common matter is lumped into standard logical function cards including extra circulatory for peculiarities of the various systems, then a system can be adapted for any burner control system of the general type now in use and only reference to the specification may be made to customize the system to the particular boiler in question.

It is therefore an object of the present invention to provide a system for controlling a boiler burner system which is adaptable to most boiler systems now in use.

It is another object of the present invention to simplify the arrangement of components of a boiler control system so that engineering and fabrication requirements are greatly reduced.

It is another object of the present invention to adapt a burner control system from a functional logic arrangement to a logical function arrangement.

SUMMARY OF THE INVENTION

There has been provided a burner control system including apparatus adapted for controlling fuel burner for firing furnace sections of steam generators in accordance with any one of a plurality of predetermined sub-system specifications such as fuel safety, ignition and shutdown sequences. The system includes a plurality of sets of logical function means (LFM) having inputs and outputs, responsive to selected ones of the parameters of the system for producing output control and indication signals respectively. Each LFM comprises one solid state control circuit card for performing each logical function in accordance with the specification such as fuel trip, burner ignition and shutdown etc. Each control circuit card is fabricated to include functional logic circuits of the AND, OR, NAND, NOR, etc., type adapted to perform each of the various individual logic steps relating to standardized logic sequences associated with fuel burner systems, when each of said LFM is selectively interconnected with other ones in the burner system. The system provides multiple functional card interchangeability in accordance with the selected interconnections thereby being capable of controlling burner systems of a general type which include standardized logic sequences and also specific logic sequence requirements peculiar to the particular system.

BRIEF DESCRIPTION OF THE DRAWINGS

The above brief description, as well as further objects, features and advantages of the present invention will be more fully appreciated by reference to the following detailed description of presently preferred but nonetheless illustrative embodiments in accordance with the present invention, when taken in connection with the accompanying drawings wherein:

FIGS. 2A–2C are block diagrams showing components of a Master Section of a Burner Control System in accordance with the present invention, in functional form wherein FIG. 2A illustrates FUEL SAFETY operation;
FIG. 2B illustrates PURGE operation;
FIG. 2C illustrates PRELIGHT operation;

FIGS. 3A–3G are block diagrams showing components of a Burner Section governing an individual burner and related equipment of a Burner Control System in accordance with the present invention in functional form wherein:

FIG. 3A illustrates BURNER FUEL TRIP and PRELIGHT operation;
FIG. 3B illustrates IGNITER operation;
FIG. 3C illustrates LIGHTOFF operation;
FIG. 3D illustrates SHUTDOWN operation;
FIG. 3E illustrates OIL GUN PURGE operation;
FIG. 3F illustrates AIR REGISTER or DAMPER operation;
FIG. 3G illustrates OIL RECIRCULATION operation;

FIGS. 7A–7B illustrate as examples Logical Function cards responsible for specific functions wherein:

FIG. 7A shows a FUEL SAFETY card for a liquid fuel system;
FIG. 7B shows a FURNACE PURGE card for a solid fuel system.

DESCRIPTION OF THE PREFERRED EMBODIMENTS

GENERAL SYSTEM DESCRIPTION

Figure 1B:
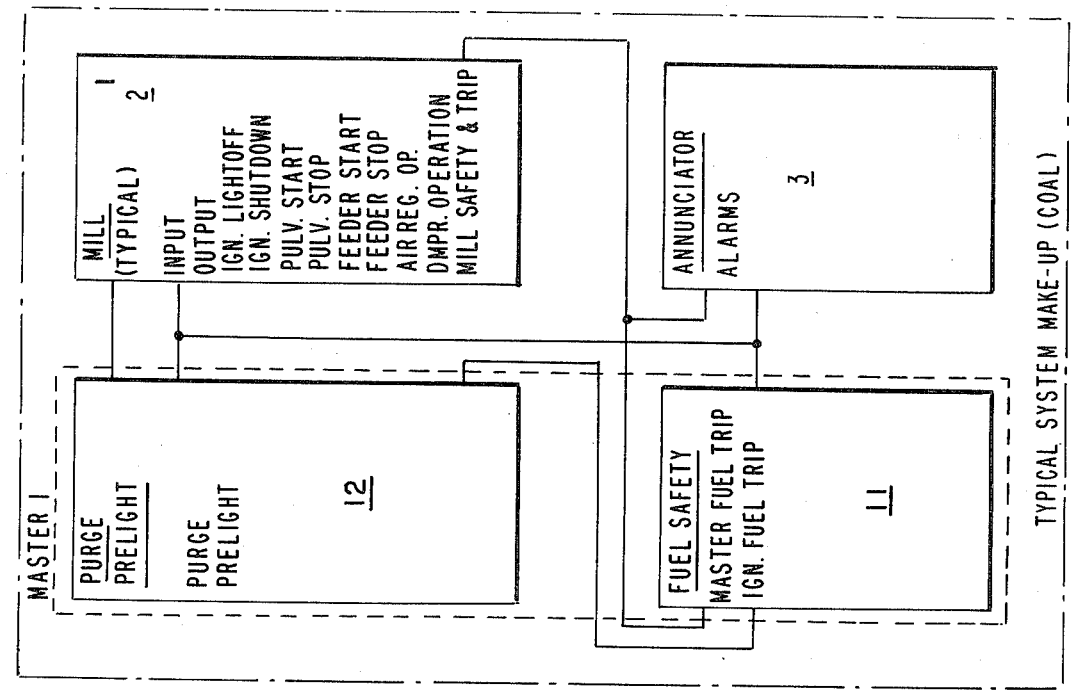
FIG. 1B is a block diagram showing a typical system arrangement of a Burner Control System in accordance with the present invention for solid fuel (coal) in functional form.

The control system for the present invention is of the integrated logic circuit design. The design is derived from an analysis of sub-system specifications. The system includes a number of sets of logical function means (LFM) having control responsibility for a certain portion of the overall system and providing for the communication of pertinent information to other sub-systems. Each LFM is packaged on a circuit card having integrated circuit functional logic elements which are designed to cooperate in the performance of the particular function.

In the functional logic card system, control circuits are developed having the necessary circuitry for forming a particular logical function, i.e., master fuel trip, ignition, etc. Inputs to the control circuits provide information as to the condition of external devices (valves, ignitors, etc.) as well as other ones of the logical function means. However, in one type of system a particular input may not be required while in another it might well be required. Therefore, certain elements may be left unconnected in those systems where they are unnecessary. The logical function card has the capacity but may not be utilized in certain situations. In certain other cases extra inputs may be required. The cards have spare input connections which expand the capability of the control circuit to be responsive to these additional required inputs. In the drawings the notation $n$ represents the general requirements for boiler or steam generator systems, whereas in specific situations more or less than $n$ inputs might be utilized. The particular description contained herein is an example of a particularly complex system, and variations of this illustrative example are possible and are provided for.

Figure 1A:
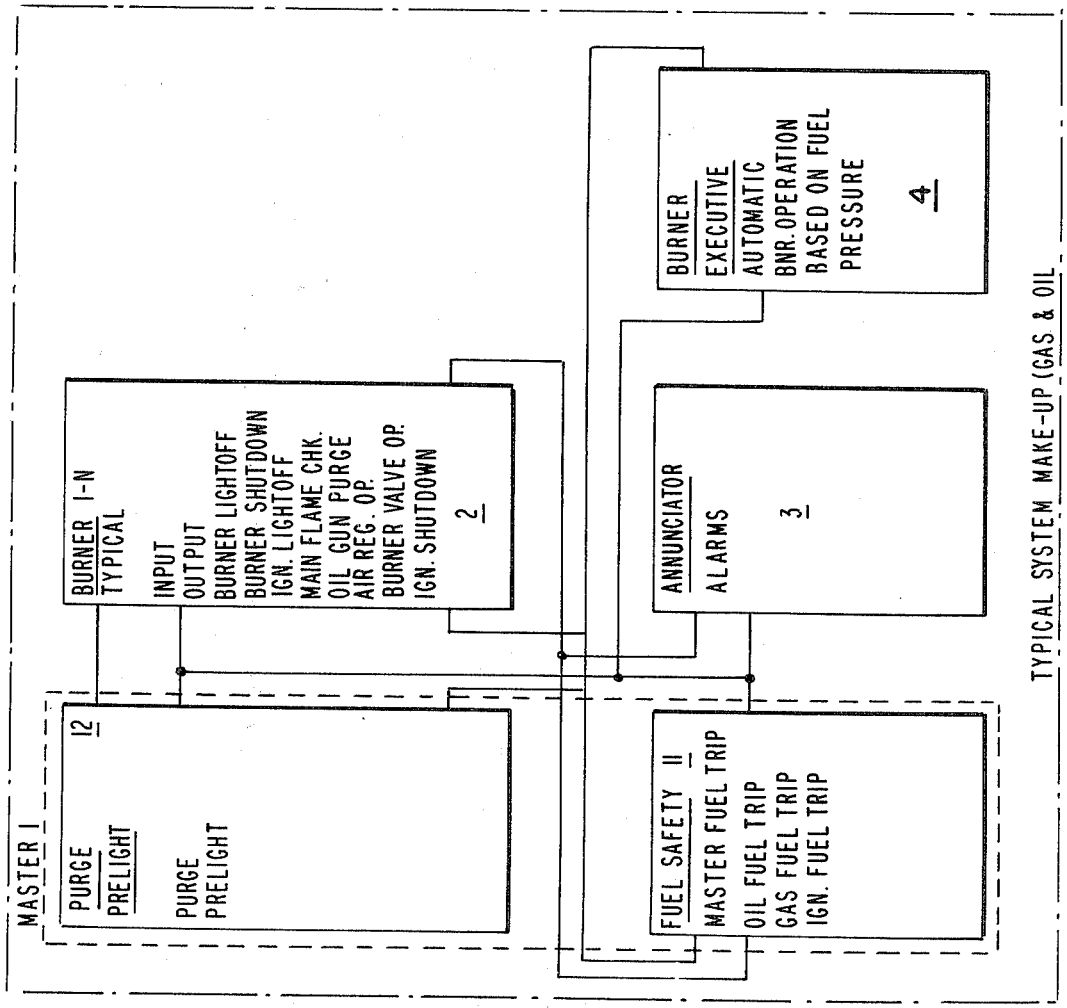
FIG. 1A is a block diagram showing a typical system arrangement of a Burner Control System in accordance with the present invention for liquid fuel (gas and oil) in functional form.

The illustration of FIG. 1A shows a burner control system divided into a number of sections which include Master 1, Burner 2, Annunciator 3 and Burner Executive System (BES) 4. FIG. 1B includes similar equipment except the burner for coal is generally referred to as a MILL 2' and no BES 4 is included because full operatorless control of solid fuel burner systems is not preferred. For each embodiment similar elements are labeled with the same reference numerals and others with related functions may be referenced with the same numeral primed.

FIGS. 1A and 1B illustrate typical system arrangements for liquid and solid fuel burner systems respectively. They are separate because liquid and solid fuel systems have different control problems. The principles of operation, however, are the same.

In FIG. 1A, Purge Prelight 12 and Fuel Safety 11 relate to the entire boiler and control the purge and prelight functions for all burners. The Fuel Safety section 11 controls the oil/gas, to all burners and gives appropriate alarms to the Annunciator 3. The Burner section controls one burner and its associated functions as listed in the drawing. BES 4 operates the entire system automatically when engaged. In FIG. 1B the typical MILL system operates in the same manner as the gas/oil system except different safety requirements are accounted for and different input output relationships are established which are common for MILL systems.

The Master section includes Fuel Safety 11, and Purge Prelight 12 logic (See FIG. 1A and 1B).

The logic for the Purge Prelight logic 12 has the major responsibility of ensuring that the furnace section of the boiler is thoroughly purged with air to remove any explosive mixture before fuel can be released into the headers. With the furnace purge complete, Prelight portion of the Master section is then responsible for the safe release of fuel into the headers (not shown) and for communicating to individual Burner sub-systems when boiler conditions are satisfactory for burner lighting. The Purge Prelight 12 section of the Master section provides the operator with sufficient indication on operations being performed.

The logic for the Fuel Safety 11 has the primary responsibility for total boiler safety. Its duty is to monitor danger points throughout the burner operation. If the predetermined limits set on the danger conditions are exceeded, the Fuel Safety logic will shut off all fuel to the burners. A first-out light feature, which is part of this section, will indicate only that condition which was responsible for the fuel trip(s).

Each individual Burner section 2 arranged in FIG. 1A has the responsibility for the operation of only one burner. The Burner 2 includes elements incorporating logical function means which must follow a program in safely placing burners in and out of service and continuously monitoring the status of the burners for safe operation.

The purpose of Annunciator section 3 is to monitor selected portions of the control system and external apparatus. If a malfunction occurs, the Annunciator 3 initiates an alarm signal which informs the operator of the condition and general location.

Before proceeding with a description of each of the components of the entire control system, an explanation of the basic breakdown of the various components and their arrangement would be beneficial.

The drawings in FIGS. 2A-C, 3A-G, and 4 each show block diagrams of the components required to provide control outputs in response to selected inputs which are listed and described further herein. For purposes of explanation certain components are included in the block diagrams which illustrate the component controlled. Further, certain sequences which may be separately wired on separate functional logic cards are discussed in the description and illustrated in a single figure because the sequences closely interrelate. For example, FIG. 3B IGNITOR SEQUENCE includes a block diagram of the components effecting Ignitor Lightoff and Shutdown in a preferred embodiment. Ignitor Lightoff and Shutdown components are fabricated on separate logical function cards. Similarly, the Annunciator illustrated in FIG. 4 includes elements 201-208 in one drawing, but in a preferred embodiment each respective element is placed on a separate logical function card.

The following description explains the operation of each of the various portions of an exemplary burner control system in accordance with the present invention (see FIGS. 1A-5). The discussion of FIGS. 6 and 7 explains the logical functional card concept as applied to the particular exemplary system.

TYPICAL SYSTEM OPERATION

The blockage of all fuel (See FIG. 2A) to the steam generator or boiler is referred to as a Master Fuel Trip (MFT). Any of the following conditions or combination of conditions listed in Fuel Safety Block 31 will initiate an MFT as discussed below.

1. Operator Tripped Master Fuel. If such conditions arise that the operator wishes to trip all fuel to the boiler, he may do so by depressing the maser fuel trip pushbutton(s) on the control panel insert.
2. Forced Draft Fan(s) Tripped. (Contact closure(s) as developed by others.)
3. Loss of all flame.
4. Failure to Light. Five minutes elapsed before the first flame is established in the furnace.
5. Drum level not within Limits. (Contact closure(s) as developed by others.)
6. Furnace Pressure Out of Limits. (Contact closure(s) as developed by others.)
7. Low Air Flow.
8. I.D. Fan(s) tripped. (Contact closure(s) as developed by others.)

A Purge Prelight cycle will be required after each MFT before any fuel can be released into the headers. Each of the above conditions will illuminate its respective display light L on an appropriately labeled panel.

When an MFT occurs, the following operations will automatically take place: the Purge section 12 will be tripped to the purge required status; all fuel trip relays will be tripped; all fuel trip valves will be closed; all burner valves will close; all ignitor valves will close; the air registers or air dampers will remain in the position they were in when the trip occurred. Occurrence of any one of the above Master Fuel Trip Conditions in Block 31 will provide a signal to Master Fuel Trip Condition Block 36 and produce a YES output at 36A for Tripping Master Fuel Trip Relay 37 which in turn will produce an output for cutting off all fuel to the boiler at Output 37A.

BOILER PURGE 12

A boiler (furnace) purge must be performed after each Master Fuel Trip, in order to remove any combustible mixture from the furnace.

Before the purge mode can be initiated primary purge permissives must be satisfied. Any number of primary purge permissives may be required but for purpose of explanation, the listing below is sufficient. FIG. 2B shows the individual permissives in Block 14 which are usually required.

PRIMARY BOILER (FURNACE) PURGE PERMISSIVES (14)

1. Forced Draft Fan(s) running.

2. Main Gas Trip Valve Closed.
3. Main Oil Trip Valve Closed.
4. Ignitor Trip Valve Closed.
5. All Burner Gas Valves Closed.
6. All Burner Oil Valves Closed.
7. All Ignitor Valves Closed.
8. Oil Recirculation Valves Closed.
9. No Boiler Trip Condition present.

With these primary purge conditions, as listed above proven satisfied, the purge mode can be initiated by momentary operator actuation of the Purge Start Switch 15 and associated Feedback 15a.

In FIG. 2B, Purge section 12 receives a plurality of inputs, namely those listed in Block 14 which inputs are coupled to Primary Boiler Purge Permissives Satisfied Block 16 over Feedback 14A which outputs a signal which indicates whether or not all Primary Permissives are satisfied. Block 16 could in its simplest form be a condition responsive gate. If any one of the nine conditions listed in Block 14 are not satisfied, the Feedback 14(a) of Block 14 delivers an input to Block 16 which in turn produces a signal (typically binary) which indicates same. If all permissives are satisfied, the input may be ONE and if not, a ZERO input would be produced. Verification Blocks (YES; NO) interpret ONEs and ZEROs respectively and produce inputs to other portions of the system as explained below.

In order to initiate a purge, there must have been a MFT 18 from Fuel safety Block 11. As shown in Purge Block 12, YES Blocks 16A, 17A and 18A must be satisfied before further progress through the purge sequence may be achieved.

Upon initiation of Purge Switch 15, MFT 18 and Primary Permissives Satisfied 16, the logic will go into the Purge Mode Locked In 21. At this time, a signal is sent through YES Block 21A to Open the Burner Air Registers or Air Damper Block 23. Should all of the above conditions not be satisfied, only those lights L illustrated whose conditions are satisfied will be illuminated.

The logic will thence continue the purge sequence to check secondary Purge Permissives Block 24 and the lights indicating they are satisfied will illuminate if not already illuminated. These secondary permissives of Block 24 are listed:

1. All air registers or air dampers fully open.
2. Air Flow > 25% of total flow. When satisfied, Block 24 provides, via Feedback Path 24a, a signal to Block 25 indicating a go condition by activation of YES Block 25A.

With all the primary and secondary purge permissives as described above held satisfied, a five (5) minute Purge Timer 27 will start and "Purge-in-Progress" light 28 will illuminate.

For the purge cycle to be successfully completed, all Purge Permissives 14 and 24 must be maintained for the full five-minute period. If any other primary or secondary permissives are momentarily lost while the purge is in progress, the purge mode will be reset over NO block 21B to Boiler Tripped Block 35 and Purge Required Block 32 and the operator will be forced to re-initiate the purge cycle as described above.

If any secondary purge permissive is momentarily lost, the Purge Timer 27 will again be reset to zero time on No block 25B. When the permissive is again satisfied, the Purge Timer 27 will automatically restart for the full five-minute period.

Should the purge mode be interrupted at any time after the purge is in progress, the Purge Required light 32 will begin flashing and a contact closure provided for annunciation.

The purge mode can be interrupted at any time by depressing the Boiler Trip pushbutton 33 in fuel safety section 11.

When all purge permissive conditions have been satisfied for the full five-minute period, the Purge Timer 27 will time out and the Purge Complete Light 34 will illuminate.

At this time, the operator may elect to stay in the purge mode, thus continuing to purge the furnace, or go into the prelight mode.

If the operator elects to continue purging the furnace, he may do so indefinitely as long as all purge permissives remain satisfied. If a purge permissive is lost at this time, the purge mode will be tripped out or tripped back to zero time, depending on the condition lost.

BOILER PRELIGHT (MFT RESET)

Figure 2A:
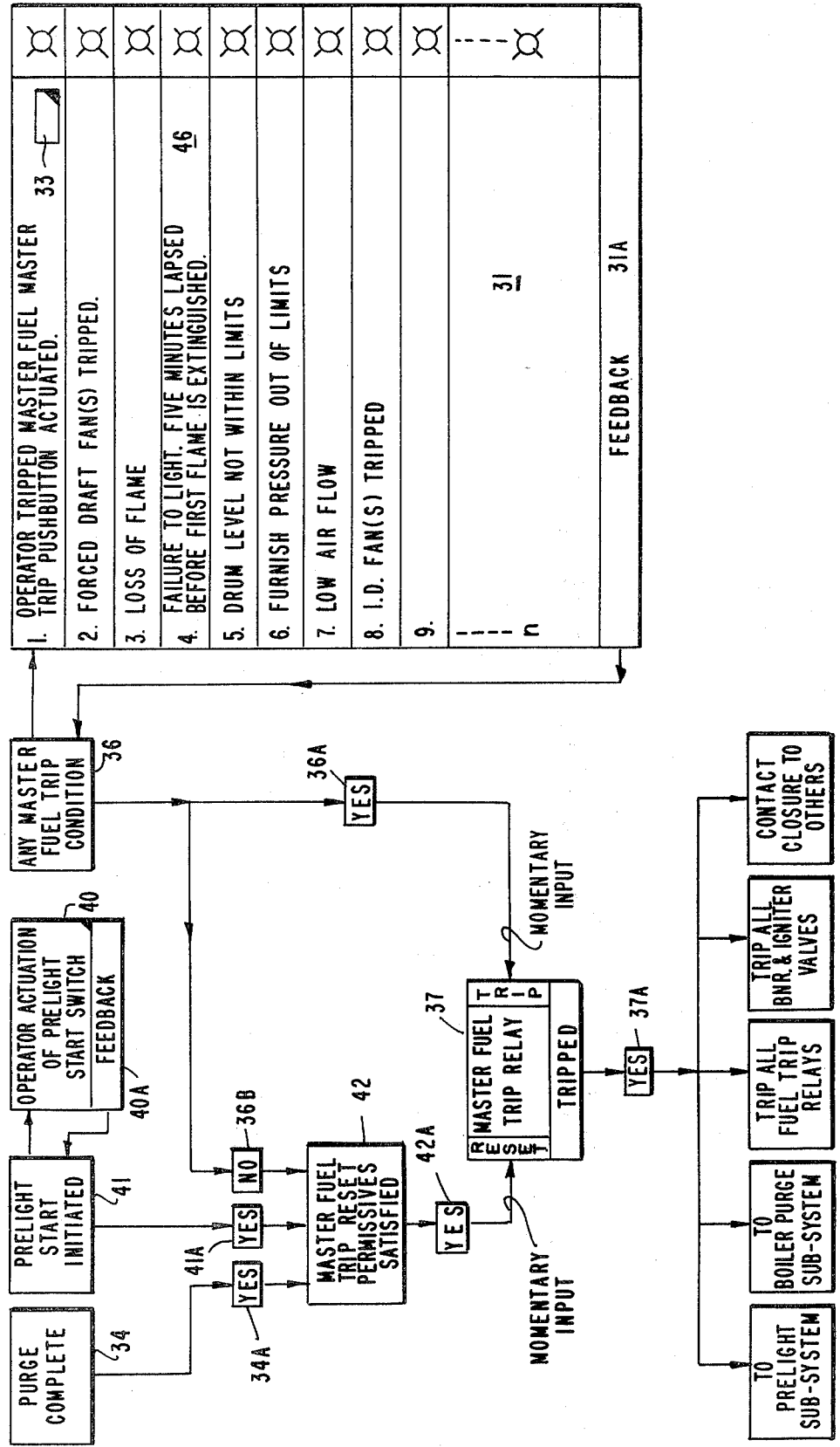

At the completion of the required five (5) minute furnace purge time requirement, as indicated by the illumination of the "Purge Complete" light 34, the operator may prelight the system by momentary actuation of the Prelight Start Switch 40 of Fuel Safety Section 11, shown in FIG. 2A.

The following sequence will be initiated: The MFT relay 37 is reset through MFT Reset Permissives Satisfied Block 42, if Purge Complete Block 34 and MFT Blocks 31 are producing YES 34A and NO 36B outputs respectively. A five (5) minute Time Delay 46 is started timing (See Block 31 condition 4). The operator has five (5) minutes to establish a flame in the furnace or the system will be tripped back to the "Purge Required" status. The purge mode will be tripped out as indicated by all Purge Permissive lights extinguishing. The "Purge Complete" 34 light will remain illuminated until the first group of ignitors are placed into service.

IGNITOR PRELIGHT

With the above sequence complete, the system at Block 13, FIG. 2C checks the following additional Prelight, Ignitor Fuel Trip (Block 26) permissives: MFT relay reset; no ignitor fuel trip condition present, hereinafter referred to as in IFT; and all ignitor valves closed (if available).

IFT RESET

At this point, providing the above conditions are proven, the IFT Relay 50 may be reset by operator actuation of the IFT valve "Open" switch 44. If MFT 42 and IFT Block 47 register negative outputs to Blocks 42A and 47A respectively, and ignitor trip valve opening initiated Block 46 and all Ignitor Valve Closed Block 48 register a YES at 48A, the following sequence of events will occur: the IFT Relay Reset Permissives Satisfied 49 will output YES 49A to reset IFT Relay 50; the IFT Valve 60 will open via valve Permissives Satisfied Block 61 and YES Block 61A, allowing fuel to flow into the ignitor header.

The Ignitor Prelight Logic continues to check the following permissive conditions at Block 13a:
1. Ignitor Fuel Trip valve fully open.
2. Ignitor header pressure satisfactory.
3. MFT and IFT relays proven reset;
4. Air Flow purge flow rate (bypassed after first burner is placed in service).

5. Ignitor Atomizing Pressure Min.
6. IFT Relay Proven Reset.

When these conditions are satisfied, a "Permission to Light Ignitors" light 54 will illuminate via Ignitor Prelight Permissives Satisfied Block 53 and YES Block 53A. The ignitors may be placed in service if the individual ignitor lighting permissives are satisfied.

The "Permission to Light Ignitor" light 54 will remain illuminated so long as the operator has permission to place an ignitor in service.

If an IFT Valve Closing Condition 67 becomes apparent by a YES output of Block 67A IFT Relay 50 is tripped which activates tripped Output 60 to initiate a closure of Valve 60. In a gas system an open signal for Open Ignitor Header Vent Valve 51 is provided. A redundant path is provided over a path including Trip Valve Closing Initiation Block 67 and YES Block 67A to Trip Valve Close 60.

IGNITOR FUEL TRIP (IFT)

An (IFT) shuts off all ignitor fuel to the furnace. It will not directly affect the other fuels that are in service.

Any of the following conditions will initiate an Ignitor Fuel Trip as listed in Block 26.
1. Master Fuel Trip (MFT).
2. Any Ignitor Valve Open and Ignitor Pressure not within limits.
3. Operator Tripped-Ignitor. Operator of the Ignitor Trip Valve "close" switch.
4. Ignitor Trip Valve Closed after having once been opened.

Low ignitor header pressure.

When an ignitor fuel trip occurs, the following operations will take place: The ignitor fuel trip valve will close; all individual ignitor valves will close.

The ignitor header vent opens when an ignitor fuel trip occurs and remains open for thirty (30) seconds after the ignitor fuel trip relay has been reset.

The next sequence is the Fuel Trip Relay Reset Prelighting for main fuel, FIG. 3A.

FUEL PRELIGHT

With the above boiler prelight sequence complete, the system at block 77 checks the following permissives: MFT 18, NO 18A; all burner fuel valves closed 79, YES 79A, main fuel trip condition present 80, NO 80A.

FUEL TRIP RESET

At this point, providing the above conditions are proven, the Fuel Prelight Block 70, FIG. 3A provides for Fuel Trip Relay 71 reset by operator actuation of the Main Fuel Trip Valve "open" switch 72.

The following sequence of events will occur:
1. Fuel Trip (FT) Relay 71 will reset.
2. The main gas/oil fuel trip valve 73 will open allowing gas or oil to the header.

With the above conditions satisfied, the Fuel Prelight Logic 70 will continue to check the following Fuel Trip permissive conditions listed in Block 74 at Block 75.
1. Main gas/oil trip valve fully open.
2. "Permission to light ignitor" signal present.
3. Fuel header pressure adequate.
4. Air flow purge flow rate (bypassed) after first burner in service.
5. MFT relay proven reset.
6. GFT/OFT relay proven reset.
7. Fuel oil temperature above minimum.
8. Atomizing pressure adequate (if applicable for oil).

When these Permissives 74 are satisfied at 75, the "Permission to Light Fuel", light 76 will illuminate and burner may be placed in service if the individual burner lighting permissives are satisfied. The "Permission to Light Fuel" light will remain illuminated so long as Permissive Conditions 74 remain satisfactory for lighting a burner.

It is further required, that to satisfy MFT Relay Permissives 77, the block should be observed which has inputs 18A, 79A and 80A to FT Relay Permissive Satisfied Block 77, which requires as in previous examples, satisfaction of MFT 18, OPEN 78 and FT 80. In this particular situation, Reset 77 has a number of inputs; i.e. Master Fuel Trip 18 (NO) 18A, Burner Valves Closed 79, YES 79A, and Fuel Trip Condition 80, NO 80A, and Operator Actuation 72 initiated 78, YES 78A. Redundancy is maintained by use of a Secondary Block 83, with input to Block 84 for closure of Fuel Trip Valve 73. Another path for Closing Trip Valve 73 is via Fuel Trip Relay 71 (tripped output over block 71A).

FUEL TRIP (FT)

A fuel trip (FT) shuts off main fuel to the furnace. It will not affect the ignitor fuel supply, the ignitors in service, nor any other fuel in service to the furnace directly.

Any of the following conditions will initiate an FT as listed in Block 81:
1. MFT
2. Any burner fuel valve OPEN and Header Pressure < Min.
3. Fuel Header Pressure > Max.
4. Burner fuel valves closed (after having been opened).
5. Main Trip Valve Closed (After having been open).
6. Operator actuation of main fuel trip valve Close switch.

When a fuel trip occurs, the following operations will take place: The Fuel Trip Valve(s) 73 will close and all burner fuel valves will close.

For gas only systems, the Main Gas Header Vent Valve 86 opens when the Fuel Trip Relay 71 is tripped, and remains open until seven (7) seconds after the first gas burner is placed in service.

The Main Gas Header Vent Valve 86 closes via Fuel Valves Closed Block 79 and Time Delay Block 88 after at least one burner is placed in service.

BURNER OPERATION

If the prelight conditions have been satisfied, as indicated by the "Permission to Light Fuel" light 76 being illuminated, for the fuel being placed in service, the burners and/or ignitors may be placed in service. The following paragraphs explain the logic for the lighting of one burner. The operation of the remaining burners is the same as the one described below.

MAINTAINED IGNITOR OPERATION

The operator may initiate an ignitor lighting sequence by the actuation of the Maintained Ignitor Switch 100 shown in FIG. 3B. This switch is a double actuated type remaining actuated until actuated a second time by the operator. This second actuation will release the ignitor from being maintained in service and place it back under the control of its associated burner's logic.

With the ignitor in the maintained operation mode, the logic will check to see that the Ignitor Ready Permissives 102 are satisfied as indicated by the "Ignitor Ready" 101 light being illuminated. These permissives of Block 102 are:

1. Permission to Light Ignitors Signal" present from the Master Logic.
2. Burner in service or burner valve(s) closed and no flame detected.
3. No ignitor flame detected.
4. No IFT signal present.
5. No MFT signal present.

In addition to these permissives 102, the logic will continue to check that: No ignitor shutdown is required 103; and NO IFT or MFT signal present 104. At this time, the ignitor logic will lock into the ignitor lighting mode and a ten (10) second (adjustable) ignitor Time Delay 105 will begin timing. The ignitor must be established in service before this time expires or the ignitor will be shut down.

The lighting sequence will continue so that the ignitor will be inserted at 106. A check is made that the ignitor is proven inserted at 107. Open Ignitor Valve Block 110 is thereafter actuated over Ignitor Valve Initial Opening Path 108 in combination with Ignitor in Service 109, and NO 109A. The Ignitor Valve 110 will open and the Ignition Transformer 111 will energize for lighting the ignitor.

"Ignitor in Service" permissives 112 are satisfied at 113 if: Ignitor Inserted 107; Ignitor Valve Open 110; Ignitor Flame Detected (Ignitor In Service 109); and No. IFT or MFT signal present from 104, 104A.

The Ignition Transformer 111 will be de-energized when the Ignitor Lighting Timer 105 times out.

The "Ignitor in Service" 114 light on the control panel will illuminate indicating to the Operator that the ignitor is in service.

IGNITOR SHUTDOWN CONDITIONS

An ignitor shutdown will be caused by any of the following:

1. Should the Ignitor Flame Detector Ignitor in Service 109 fail to detect flame anytime 10 seconds (adjustable) after the ignitor lighting mode is initiated.
2. Operator actuation of the "Stop Ignitor" 115 switch providing the ignitor is not required by its associated Burner Logic 116.
3. The ignitor will be shutdown on an MFT (102, 104).
4. The ignitor will be shutdown on an IFT (102, 103).
5. Failure of the ignitor to remain fully inserted 107.
6. Failure of the ignitor valve to remain fully open 110.
7. If the ignitor lighting was a result of the burner being placed into service, the ignitor will be shutdown when the Burner Sequence Timer 105 times out — provided the MAINTAINED IGNITOR SWITCH 100 IS NOT ACTUATED.
8. If the ignitor lighting was a result of the oil gun purge logic (if applicable), the ignitor will be shutdown at the completion of the oil gun purge — provided the MAINTAINED IGNITOR SWITCH 100 IS NOT ACTUATED.
9. A second actuation of the "push-push" MAINTAINED IGNITOR SWITCH 100 will shut the ignitor down provided an ignitor stop is required by its associated Burner Logic 116.

With an ignitor shutdown signal present, the following occurs:

1. The ignitor logic is removed from the lighting mode.
2. The Ignition Transformer 111 will be de-energized, if energized.
3. The ignitor valve(s) 110 will close.

An ignitor trouble alarm 118 will be generated should the ignitor fail to be in service properly anytime it is supposed to be 117. This is indicated by the "Ignitor Trouble Light" on the respective control panel insert and a momentary contact closure for an audible output to others.

IGNITOR LOGIC SEQUENCE

AUTOMATIC IGNITOR LIGHTING

With the Ignitor Required by the Burner Logic 119 on, and Maintained Ignitor Switch 100 off, the Ignitor Logic will check to see that the Ignitor Ready Permissives 102 are satisfied as indicated by the "Ignitor Ready" 101 light being illuminated. These permissives are listed in block 102 and noted above for Maintained Ignitor Operation.

In addition to these permissives, the logic will continue to check that:

1. Burner Air Register or Air Damper Lightoff Position (if required). 120
2. No ignitor shutdown is requied (as described below). 103
3. No IFT or MFT signal present. 104

At this time the Ignitor Logic will lock into the Ignitor Lighting Mode and the ten (10) second (adjustable) Ignitor Time Delay 105 will begin timing. The ignitor must be established in service before this time expires or the ignitor will be shut down. The logic sequence is the same as previously described for Maintained Ignitor Switch actuated 100.

Other ignitor logic packages are available and require different lighting sequences. However, the system described above illustrates a typical ignitor sequence for many typical burner systems available. For example, in certain systems a different sequence may be required; however, the safety checks are essentially the same as the preceding system with variations peculiar to the ignitor type reset.

REMOTE BURNER LIGHTING

In order to initiate a burner lightoff cycle (FIG. 3C), the following Burner Lightoff Permissives 126 must be proven satisfied 127 for the respective burner.

1. MFT relay reset.
2. "Permission to Light Ignitor" signal present from the Master Logic.
3. "Permission to Light Fuel" signal present from the Master Logic.
4. Ignitor valve closed and no ignitor flame detected or the respective burner's ignitor in service.
5. Burner valve(s) closed.
6. No main flame detected (this burner).
7. FT (Fuel Trip) relay reset.
8. IFT (Ignitor Fuel Trip) relay reset.

n Oil gun coupled. (Oil systems only). With the above permissives 127 satisfied, the respective "Burner Ready" 121 light on the control panel insert will be illuminated. At this time, a burner may be placed in service by operator actuation of the respective Burner "Start" Switch 129.

Once initiated, the burner logic is locked into the Lightoff Mode 128 and a burner lightoff sequence is started and will be interrupted only by the following conditions.

1. A burner shutdown command 130 as described under Burner Shutdown Sequence below.
2. A fuel trip any source.
3. A sixty (60) second (adjustable) Lightoff Sequence Timer 131 timing out, indicating the lighting sequence is complete.

Once the Burner Lightoff Mode 128 is Locked-in 128A, the following occurs: sixty (60) second (adjustable) Timer 131 is started over YES 128B which establishes the time limit for putting the burner in service successfully; the Air Register 132 is commanded closed, if open, provided no burner valve is open; and the "Ignitor Required by Burner Logic" 116 output is generated so that the ignitor associated with this burner will be placed in service as described above.

When the ignitor is proven in service 114, the Burner Sequence Timer 131 will reset to time the full time. This allows the ignitor to be in service for the full sequence time during burner lighting as a minimum.

With the ignitor established in service 114, the burner lighting sequence will continue as follows:

Once the ignitor is proven in service 114, the appropriate "Ignitor-in-Service" light L will illuminate. The burner is inserted at 134 and checked at 135. With the burner proven inserted 134, the Burner Air Register 136 will go open 138 (oil only); the Burner 137 and atomizing valve(s) will begin opening as soon as the Air Register 136 of the burner has begun opening, and so long as the following conditions 139 are maintained.

1. Logic in lightoff mode.
2. Ignitor in service.
3. No burner shutdown signal present.
4. Burner air register not fully closed.
5. Oil gun coupled and extended (oil only).

A Main Flame 140 must be detected within ten (10) seconds after the valve reaches its fully open position 142, or the burner will shut down. The main flame light L will illuminate when Main Flame 140 is detected. When the sixty (60) second Timer 131 times out, the ignitor may be shut down 131A–131B and the burner logic taken out of the Lightoff Mode 128, since it is complete at this time.

When the burner valve is proven fully open 142, a main flame is detected 141, and no burner shutdown condition is present 143, the burner is considered to be in service 144.

BURNER SHUTDOWNS

There are several conditions or combination of conditions that will cause a Burner to Shutdown. They are as follows 150:

1. As discussed under burner lighting, the ignitor will remain in service for a minimum of sixty (60) seconds 131 from the time the ignitor is first proven in service 109 during the burner lighting mode. If the ignitor is lost during this time and the lighting sequence has proceeded to the point that the fuel valve has left the closed position 138, the lighting cycle will be reversed and the burner will shut down. 2. A main flame must be proven 140 within ten (10) seconds after the fuel valve reaches its fully open position 142, or the burner will be shut down. Anytime main flame is lost after it is established (after the ten second timer times out), the burner will be shut down.
3. Should the burner's air register or air damper (as applicable) fail to remain fully open after the lighting cycle is completed, the burner will be shut down.
4. If "Permission to Light Fuel 76" signal is lost during the lighting sequence and main flame is not detected by this time, or lost after detection, a burner shutdown will occur.
5. Should the burner fuel valve fail to remain fully open after the lighting cycle is complete, a burner shutdown will occur.
6. Should the burner fuel valve start open and fail to be fully open within fifteen (15) seconds after it starts open, a burner shutdown will occur.
7. Failure to detect main flame by the time the valve reaches fully open position.
8. Failure of the fuel burner to remain fully extended or coupled.

Anytime a burner is tripped 151 by one of the above causes, the respective Burner Alarm Light 152 will be illuminated and a momentary contact closure provided for an audible indication.

There are several conditions 154 or combinations of conditions that will cause a normal burner shutdown command 153. They are as follows:

1. Anytime during the lighting cycle or anytime a burner is in service, the operator may shut down the burner by actuation of the burner "Off" 155 switch on the control panel insert.
2. Any of the conditions or combination of conditions which will cause a Master Fuel supervision. These conditions are discussed in the fuel safety section.
3. Any of the conditions or combination of conditions which will cause a gas trip.
4. Operator actuation of the local oil burner "Off" switch 155A (extra).
5. Shutdown command from the burner executive system 156.
6. Any of the conditions or combination of conditions which will cause a fuel trip will shut down all oil burners under supervision. These conditions are discussed in the fuel safety section.

A burner shutdown will always consist of closing the respective burner valve(s) 137. Other operations that will be performed as part of a burner shutdown will be determined by the status of the boiler and of the burner at the time the shutdown occurred.

For example if a shutdown occurs with only the ignitor on, then only the ignitor will be shut down (as discussed above in the ignitor section). If a shutdown occurs anytime after the valve has left the fully closed position, 138, the valve 137 will be closed 158. Should a burner shutdown occur and the burner valve 138 fail to go closed within 15 seconds, the time set in the Time Delay 160, an "Unsuccessful Burner Shutdown" alarm 161 will be generated. The Burner Air Register or Air Damper 133 will go closed providing the cause of the shutdown was not an MFT, and the total air flow is greater than 25%. It is an operator function to position the idle air registers or air dampers.

OIL GUN PURGE (Oil System only FIG. 3E)

An oil gun purge is required every time an oil burner is taken out of service, either by the operator, or the burner logic, provided the Burner Oil Valve 170 is not already closed.

As soon as the burner oil valve reaches the fully closed position 170c, the logic will be locked into the oil gun purge required mode. 171

Once locked into the Oil Gun Purge Required Mode 171, the logic checks to see that the following permissives 172 are satisfied. 173

1. Burner logic not in burner lightoff mode.

2. Burner oil gun coupled.
3. Burner oil gun extended.
4. Burner oil valve fully closed.
5. "Permission to Light Ignitor" signal is present. (from Master Logic).

n No master fuel trip (MFT) signal present.

With the above permissives 172 satisfied 173, the following sequence of events occurs: An Ignitor Lighting 116 sequence is initiated as described under "Ignitor Lighting" provided the ignitor is not already in service. With the ignitor proven in service 114, the Oil Gun Purge Valve 174 will open. The adjustable two (2) minute Oil Gun Purge Time Delay 176, which establishes the oil gun purge time, is started. At the time the Purge Valve 174 is opened, a ten (10) second Time Delay 177 is started. If the Cleaning Pressure 178 is not present within this period, an Oil Gun Purge Block 179 will occur and an alarm will actuate as described below.

Providing all oil gun purge requirements 172 as described above remain satisfied, the oil gun will continue to be purged (once opened) for two minutes.

Should the oil gun purge cycle be interrupted or fail to start, the Oil gun purge Blocked Alarm 180 will be generated. The following conditions or combination of conditions will cause an oil gun purge block.

1. Loss of Ignitor Flame 114B during the oil gun purge cycle.
2. Loss of Purge Cleaning Pressure 178 during the oil gun purge cycle.
3. MFT.
4. Failure of the oil gun to remain coupled or fully extended.
5. Loss of ignitor lighting permissive from prelight logic.

When an Oil Gun Purge Block 179 occurs, the purge cycle will be stopped, the ignitor shuts down, and purge valve closed. In addition, the respective Oil Gun Purge Blocked 179 light on the control panel insert will illuminate.

The oil gun purge may be reinitiated by operator actuation of the respective Oil Gun Purge Blocked Switch 179 momentarily or by re-establishing the oil gun purge permissives.

OIL GUN RETRACTION

At the completion of a successful Oil Gun Purge 181 and providing the burner oil valve is closed, the oil gun will be retracted and the following will occur:

1. The Purge Cleaning Valve 174A will close.
2. The oil gun purge logic will be removed from the oil gun purge required status.
3. The ignitor will no longer be required. (See ignitor section).
4. The oil gun will be retracted and checked 182.

During a lighting cycle, should a shutdown occur before the Oil Valve 174 goes off its fully closed position, then the oil gun will be retracted since no oil gun purge would be necessary.

In addition, at the end of a successful oil gun purge, the respective Purge Valve 174A will be closed.

FLAME DETECTION

Flame detection in this system may be accomplished by use of any reliable flame detector but preferably one similar to the one shown in U.S. Pat. No. 3,437,807. Each respective detector is energized when the flame is detected. Its contacts and inputs are used as interlocks in the system. Loss of flame deenergizes the detector and causes a "loss of flame" causing the ignitor and/or burner to shut down.

FLAME DETECTOR CHECK

Flame failure protection is an important function of a burner control system. If a malfunction should occur in a detector, this protection may be lost. For this reason, the burner control system has several checks on the proper operations of the flame detectors. As discussed under burner and ignitor operations, the flame detector(s) must be working properly as a permissive for lighting a burner. Since burners may be in service for long periods of time, it is also necessary that main flame detectors be checked for operation while the burners are in service, to ensure that they will function properly and shut down the burner pair, if a flame out occurs. This is done automatically by the system as follows: with an ignitor and/or a burner pair in service under supervision, the flame detectors may be checked, for example, once every fifteen (15) minutes. The checker circuit is energized and the sensing elements of the detectors are blinded (electronically or mechanically from the flame UV or IR radiation. The detectors should act as though a flame out had occured (i.e. the flame amplifier output should de-energize). The flame amplifier output will deenergize if the test is successful. However, the burner and/or ignitor will not shut down because the checking system simulates a flame for the duration of the checking cycle. The system proves that the detector sees no flame before unblinding the sensing unit. The operator will not know that the detectors are being checked unless a malfunction is detected. If a flame detector malfunction is found by the check system shown in FIG. 4 (element 204) and in FIG. 3C, the respective flame light on the individual burner pair panel or the annunciation panel as required, will flash on and off rapidly to indicate which burner or ignitor the unsuccessful detector check is on. A Flame Light 140-L will remain flashing until steps are taken to correct the malfunction of the detector. An alarm will be generated as described under the annunciator description below.

AIR REGISTER OR DAMPER OPERATION

A burner's air register may or may not close on a burner shutdown, depending on boiler conditions, as illustrated in FIG. 3F. A Burner's Air Register 210 will close due to a Burner Shutdown 211, not caused by an MFT, provided no MFT signal is present and the total air flow is greater than 25% (211). Besides an MFT, blockage of a burner's air register cannot occur anytime the burner valve(s) is fully open in accordance with Burner Logic 212. Registers will close during lightoff (215) as discussed previously. Furthermore, operator actuation of remote or local "close" switch 213 (optional) actuates the registers provided the Permissives 211 are satisfied.

A burner's air register will open during Burner Lightoff Initiation (providing the ignitor flame of the burner is detected) during the purge sequence when a multi-register opening signal from the Purge Logic 216 is produced. Operator actuation of the remote or local "Open" 217 switch may also be utilized (optional).

Figure 3G:
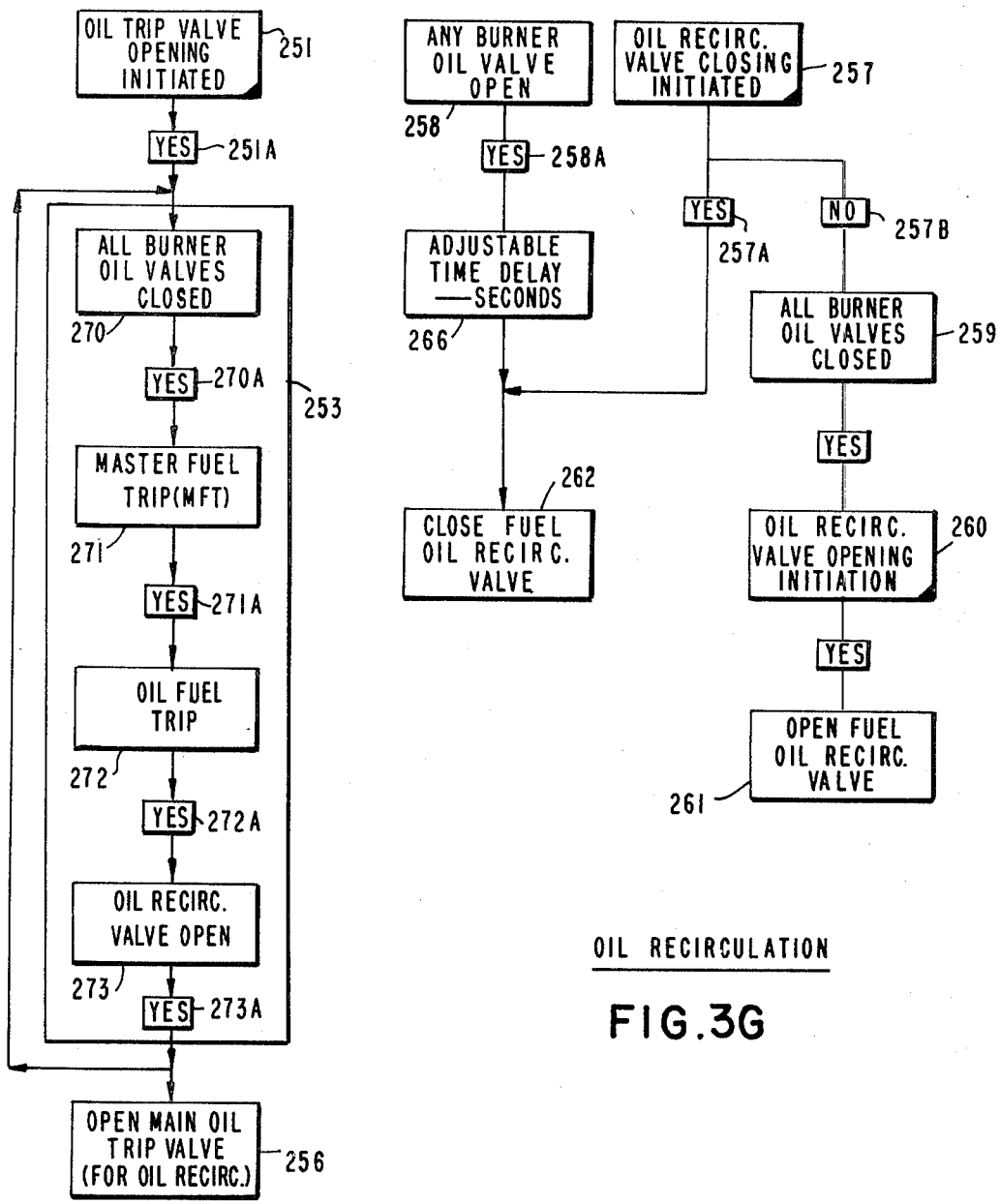

FUEL OIL RECIRCULATION LOGIC (Oil Systems Only) FIG. 3G

The fuel oil recirculation valve 261 can be opened in preparation for placing oil in service both before the boiler purge is accomplished and after it has been completed. Both the recirculation valve 261 and the fuel oil trip 256 valve must be closed during the boiler (furnace) purge mode.

FUEL OIL RECIRCULATION WITH UNIT TRIPPED

Oil may be recirculated with the furnace unit completely tripped. This may be accomplished by actuation of the fuel oil recirculation valve "open" switch 260. At this time, the logic will ensure that the following permissive is satisfied before allowing the oil recirculation valve to open, namely that all individual burner oil valves are closed 259.

The fuel oil trip valve may now be opened by actuation of the oil trip valve "open" switch 251. At this time, the logic will ensure that the following permissives are satisfied at 253 and remain satisfied before allowing the Fuel Oil Trip Valve 256 to open.
1. All burner oil valves closed. 270
2. Master fuel trip present. 271
3. Oil fuel trip present. 272
n Fuel oil recirculation valve open. 273

The system may be removed from the oil recirculation mode at any time by actuation of the fuel oil recirculation close switch 257 or by loss of any of the four permissives above.

FUEL OIL RECIRCULATION AFTER PURGE IS COMPLETE 1

The fuel oil recirculation valve may be opened after the completion of the oil prelight sequence and prior to placing a burner in service on oil. This is accomplished by the operator actuation of the fuel oil recirculation valve open switch 260. The oil recirculation valve will be closed at 262 automatically when the first burner oil valve has been opened 258 in accordance with Time Delay 266.

From the foregoing, it can be seen that a logic system has been developed for controlling the operation of a burner furnace system. The apparatus disclosed herein in block form provides for the grouping of burner functions into systems which are as nearly as possibly sequentially operated with cross-communication between the sub-systems such that redundancy and consent checking are always in progress. The particular conditions which may cause a Master Fuel Trip or a Burner Fuel Trip etc., while important for a particular operational specification, are not the critical operative factors in the present invention. This system, is compatible with any one of a number of different types of boiler systems presently available and therefore, eliminates specialized designs for similar systems which have certain operational idiosyncrasies required by the particular purchaser.

ANNUNCIATOR LOGIC — GAS AND OIL SYSTEMS (FIG. 4)

Figure 4:
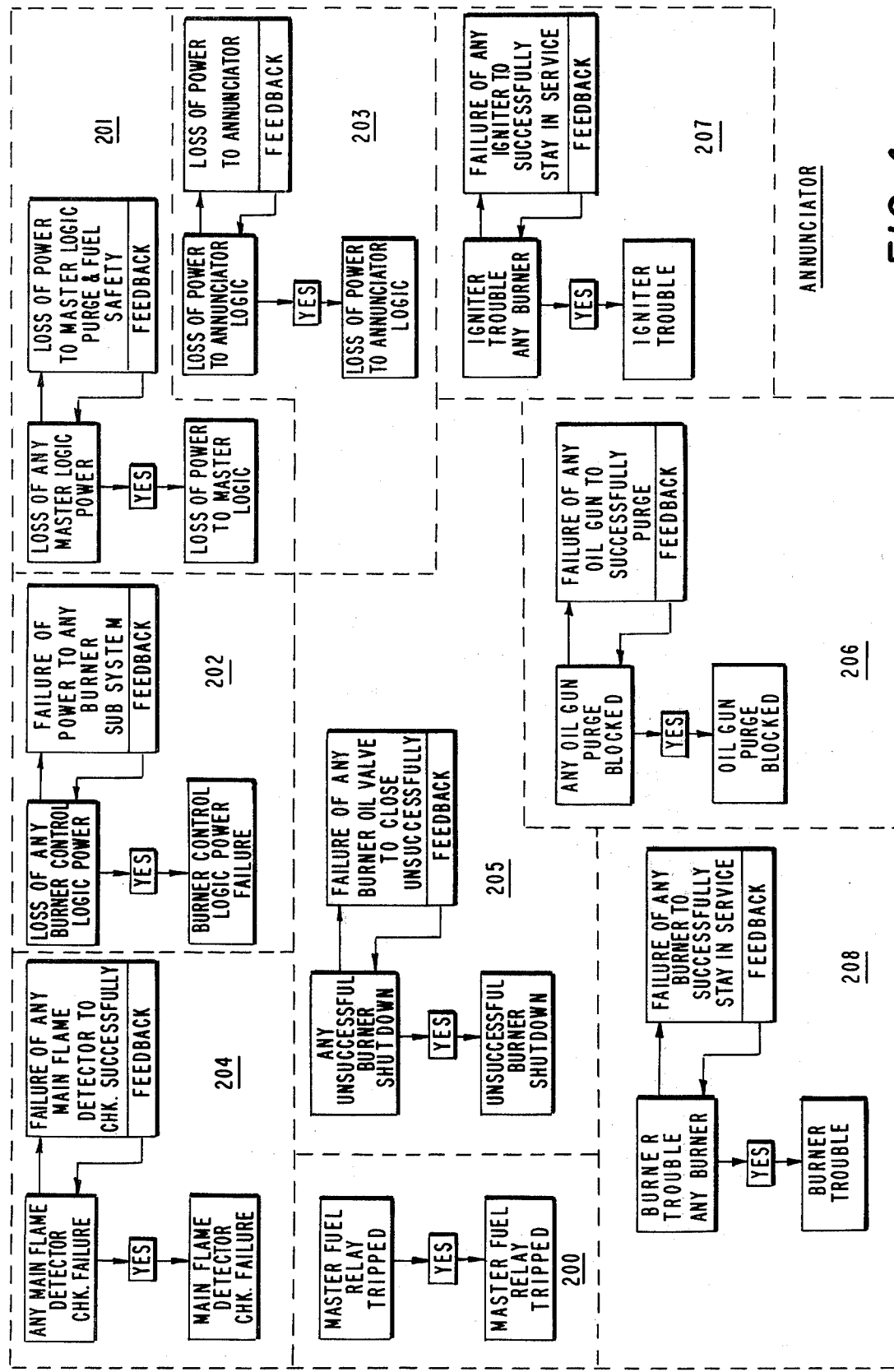
FIG. 4 is a block diagram showing components of an Annunciator Section of a Burner Control System in accordance with the present invention in functional form.

The purpose of this system is to monitor all other sub-systems as well as other points and make known to the operator conditions which require attention. The conditions or combination of conditions below will cause a contact to close or open as desired to provide audible and/or visual indication of an alarm condition. These alarm conditions shown in block form in FIG. 4 are as follows:
1. Master fuel relay tripped. 200
2. "Loss of Power to Master Logic." 201
3. "Burner Control Logic Power Failure." 202
4. "Loss of Power to Annunciator Logic." 203
5. Main Flame Detector Failure." Should any main flame detector check sequence fail, this alarm will be generated. 204
6. "Unsuccessful Burner Shutdown." Should any burner valve fail to close within fifteen (15) seconds after initiation of a closing signal and flame is lost on the burner, this alarm will be generated. 205
7. "Oil Gun Purge Blocked." This alarm is generated if an oil gun purge sequence fails to start or is interrupted; as described in the oil gun purge section of the burner logic section. 206
8. "Ignitor Trouble." Should any ignitor fail to successfully stay in service, this alarm will be generated. 207
9. "Burner Trouble." Should any burner fail to successfully stay in service, this alarm will be generated. 208

Outputs of Master Fuel Relay Tripped 200 and loss of power to Annunciator Logic 203 above are maintained outputs as long as the alarm condition exists. Outputs of the remaining alarms remain closed as long as the alarm condition exists. On subsequent alarms, the respective contact opens momentarily and then recloses.

BURNER EXECUTIVE SECTION

Figure 5:
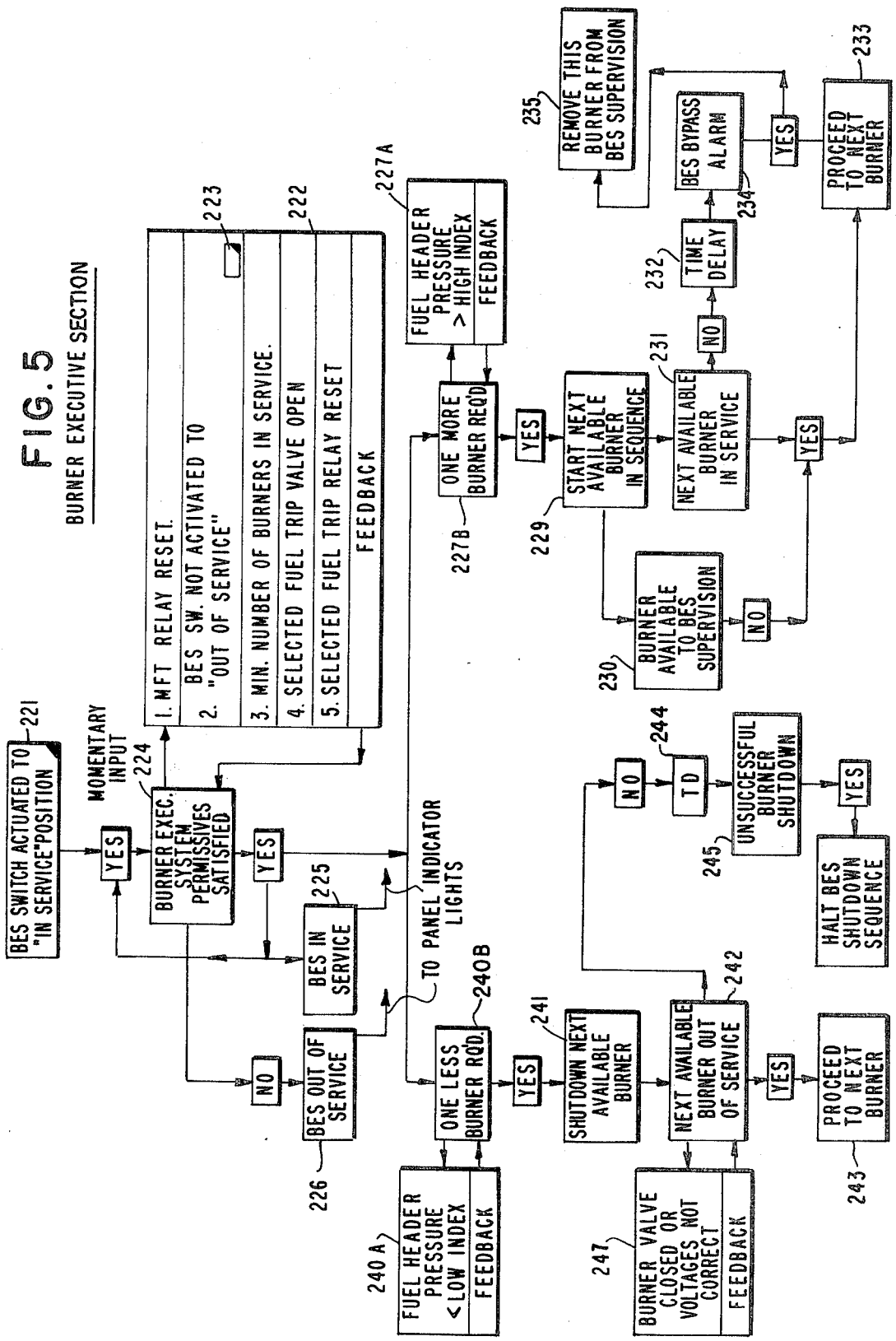
FIG. 5 is a block diagram showing components of a Burner Executive Section of a Burner Control System in accordance with the present invention in functional form.

The Burner Executive Section (BES) shown in FIG. 5 is used to automatically place burners in service or remove burners from service to meet varying load demands. The BES is placed in service by momentary operator actuation of the "BES in Service" switch 221; provided the following permissives listed at 222 are met:
1. MFT (master fuel trip) relay reset.
2. BES switch 223 not actuated to the "Out of Service" position.
3. Minimum number of burners in service.
4. Selected fuel trip valve open.
n Selected fuel trip relay reset.

With the above permissives satisfied 224, momentary actuation of the BES in Service switch 221 will lock the BES logic into the BES mode 225. The BES Out of Service 226 light will extinguish, the BES in Service 225 light will illuminate, and the BES logic will check the fuel header pressure to determine whether to place burners in service or to remove burners from service. If the fuel header pressure is greater than the high index 227a, the BES logic will require another burner 227b, and will determine if the next burner in sequence is available to BES supervision 229. A burner is available to BES supervision if it is not already in service or is not bypassed. If the burner is available, the BES logic sends a lightoff pulse to the burner and starts a Time Delay 232. If the burner comes into service at 231 before expiration of the time delay, the time delay is reset and the BES proceeds to the next burner 233. This action will continue as long as the fuel header pressure is above the high index 227a. If a burner does not come into service before expiration of the Timer Delay 232, a BES Bypass Alarm 234 is generated and the burner is removed from BES supervisin 235. The BES logic then proceeds to the next burner 233 and continues the sequence described above. If a burner is not available to BES supervision 230, the BES proceeds to the next burner 233 and continues the sequence described above.

Once the fuel header pressure falls below the high index 227a, but is still above the low index 240a, the BES logic maintains status quo. It does not light any more burners, nor does it shut down any burners. If, however, the fuel header pressure falls below the low index, the BES logic will require one less burner 240B. In reducing the burners in service, the BES 220 determines if the next burner in sequence is available to BES supervision 241. A burner is available to BES shutdown supervision if it is in service or is not bypassed. If the burner is available, the BES logic sends a shutdown signal to take the next available burner out of service 242 and starts a time delay. If the burner successfully shuts down before expiration of the time delay is reset and the BES proceeds to the next burner 243. If a burner does not successfully shut down before expiraton of the Time Delay 244, the BES shutdown sequence is halted and the burner logic generates an "Unsuccessful Burner Shutdown" signal at 245. If a burner is not available to BES supervision, the BES proceeds to the next burner and continues the sequence described above.

FUNCTIONAL CONCEPT - LOGICAL FUNCTION MEANS

Figure 6:
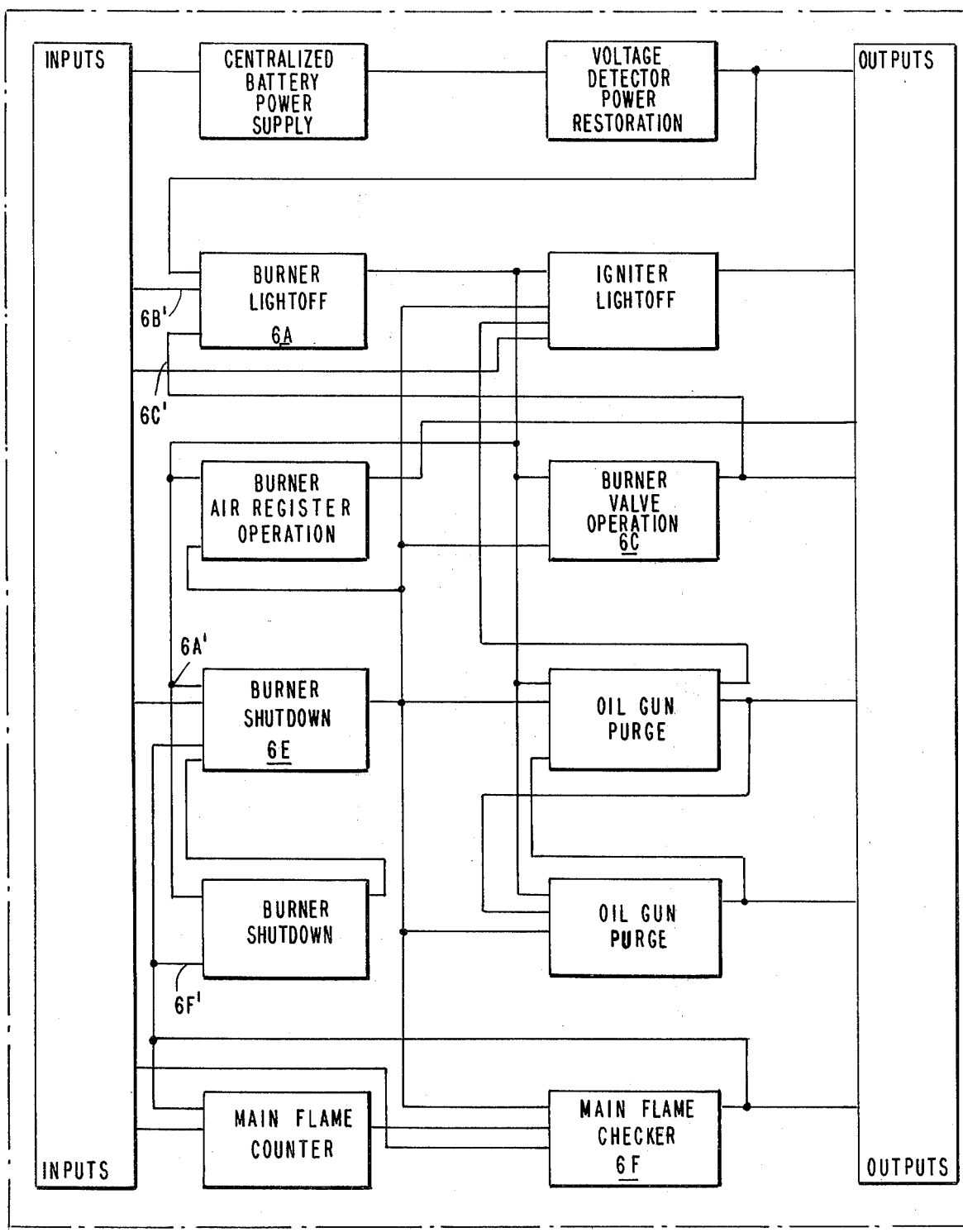
FIG. 6 is an illustration of an arrangement of Logical Function cards forming a typical Burner Section in a Burner Control System in accordance with the present invention.

A typical arrangement of logical function cards for controlling the burner sub-system previously discussed is described below. FIG. 6 shows one illustrative example of how the cards may be systematized into a subsystem grouping of logical function means (LFM). For example, burner light-off card 6A shows the card subject to certain inputs 6B which are illustrated in FIG. 3C at reference 126. The burner valve card 6C provides an input 6C' for indicating its condition as a redundant input. The shutdown card 6E has inputs as illustrated in FIG. 3D, References 150 and 154, as well as from other cards e.g., flame checker 6F and Lightoff 6A, etc. The other cards each relate to an appropriate sub-system for operating a portion of the entire system each of which is in the form of a logical function. A logical function is the operational sequences related to a function of the burner control system of a more complex nature than the discrete AND/OR/NOR/NAND logic functions. The LFM has a stepwise relation to burner safety in a logical function sense rather than a strict logic sense. The operaion of a burner control system proceeds in a check list manner for Purge/- Prelight/Lightoff/ Shutdown/ and Trip. The system herein has been formulated with a stepwise approach as a beginning. This approach has been utilized to further segment the broad steps or concepts and further produce sub-systems with logical functions.

As illustrated in FIGS. 1A–B and FIG. 6., there is shown a functional breakdown of the burner control.

In FIG. 1B, the Mill system illustrated, includes, in addition to Input/Output Interfacing, sub-systems for Ignitor Lightoff/Ignitor Shutdown/Pulverizer Start/Pulverizer Stop, etc. Each sub-system has at least one but most likely a series of functional logic steps to perform (AND/OR, etc.). These logic steps for a Mill are different for a burner but the concept is the same. The logic steps indigenous to Mill Stop are incorporated into a card (LFM) having a logical function for responding to Mill Stop conditions and effecting the function.

LOGICAL FUNCTION MEANS - (CARDS)

Figure 7A:
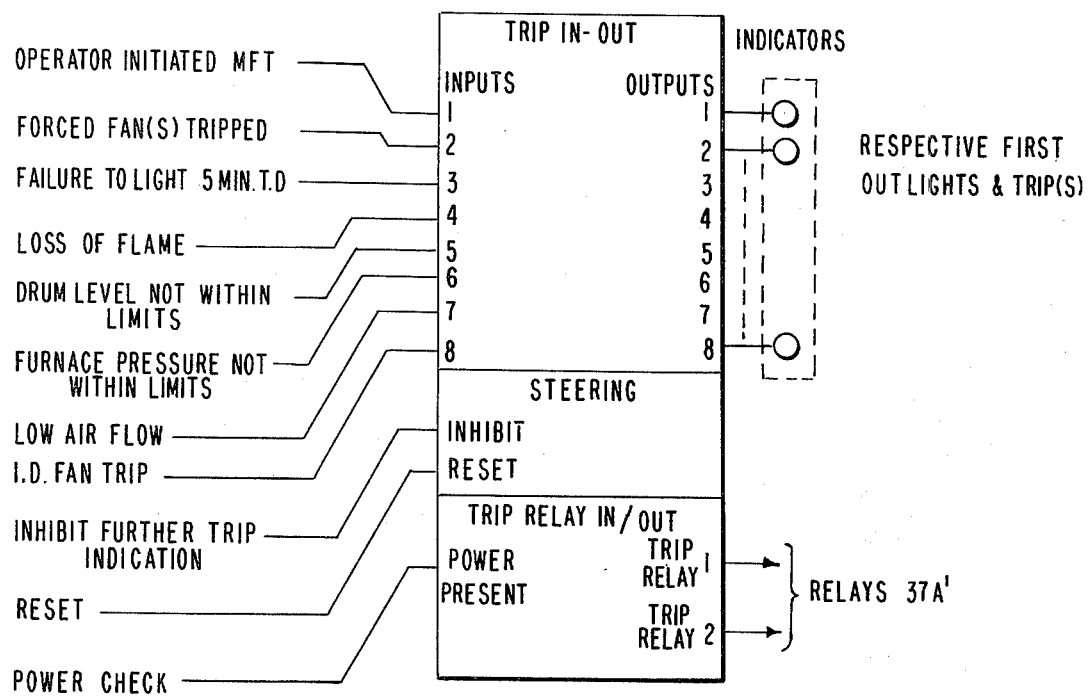

An example of an LFM is Fuel LFM Card shown in FIG. 7A. Inputs are shown and labeled on the left and outputs on the right. It should be understood that any convenient arrangement, such as a card with $x$ pins on one edge, may be used with appropriate wiring. The Fuel Safety LFM is shown with inputs and outputs labeled to illustrate the Logical Function Concept more clearly. Inputs are placed on the card of FIG. 7A. The inputs include those referred to in FIG. 2A, block 31 and also a power check and inhibit. Since one trip condition can precipitate another, the first condition to initiate a trip is communicated to a corresponding indicator. The Inhibit holds the indication of other trip conditions so that the operator knows what trip condition was first to occur.

Outputs corresponding to trip inputs are coupled to the indicators illustrated and also to other LFM cards. The specific card operation is a function of the design but it is clear in the present example that a master fuel trip output of Fuel Safety LFM will output the Relay Terminals to communicate a trip for all fuel, e.g., see FIG. 2A, Element 37.

An example of a coal system LFM is shown in FIG. 7B. In this example a Furnace Purge LFM is shown. Recalling FIG. 2B, the Purge cycle is essentially the same for a coal system as for oil/gas. The differences are those which are peculiar to Mill systems. In FIG. 2B, Elements 14 and 24 are primary and secondary Purge Permissives respectively. The listings below may be substituted for the respective Permissive Elements above and a Mill system is described:

PRIMARY PERMISSIVES

1. FD Fan Running and Discharge Damper Open — Either A or B Forced Draft Fan running and the respective Discharge Damper(s) fully open.
2. Ignitor Trip Valve closed.
3. All Pulverizers and Feeders stopped.
4. All Burner Shut-off Dampers closed.
5. Precipitators tripped.
6. All Ignitor valves closed.
7. No Boiler Trip Condition Present - one purpose of this Purge Permissive is to provide the Operator with the means of breaking or interrupting the Boiler Purge Cycle if he so desires by using the Operator Trip Pushbutton.
8. Precipitator Seal Air Fans running.
9. Penthouse Seal Air Pressure normal.

$n$. Scanner Seal Air Pressure normal.

Once the purge mode is locked in (YES 21A) certain regulating registers (contact permissives to others) 23(B) are opened as follows:

1. Open Superheater Regulating Damper.
2. Open Reheater Regulating Damper.
3. Open Primary Flue Gas Dampers. Thereafter the secondary Purge Permissives 24 are detected:
1. All burner Air Registers in Lightoff position.
2. Air Flow > 25%.
3. Superheat Regulating Damper open.
4. Reheat Regulating Damper open.
5. Secondary and Primary Air heaters running.
6. Boiler seal air pressure normal.
7. Secondary and primary Air Heater Gas Inlet and Outlet Dampers and Air Outlet Dampers open.
8. Primary Air Heater Flue Gas Dampers open.

Since the system operates essentially in the same manner as previously described for FIG. 2B it is sufficient to note that the above substitutions relate basically to the inputs with essentially no logic differences. For example, pulverizers must be stopped during Purge. Burner shutoff dampers which regulate pulverized coal flow are also closed. In a pressurized boiler, Seal Air Fans are activated to predetermined settings. The Purge LFM of FIG. 7B shows the card which has Inputs corresponding to the Permissives listed above as well as other Inputs. Outputs are also listed in FIG. 7B which correspond to the Purge system outputs necessary to complete the functional Purge cycle.

The cards illustrated in FIGS. 7A–B are shown as examples of typical arrangements of inputs and outputs for logical function cards. The internal logic for each card may be different depending on the function. It should be understood, however, that cards for different functions may be identical but have different inputs, including jumpers and the like to conform the card to the particular desired function.

The cards are arranged in any convenient fashion by grouping the required inputs and outputs associated with a particular logical function and the logic therebetween. The logic is a function of the preferred arrangement of input and outputs for each card. It is, however, preferred that the logic for a particular logical function (e.g. - furnace purge FIG. 7B), be grouped on one card. Such an arrangement makes it possible to remove a card from its particular location and immediately replace the card, if defective, with a new logical function card.

The system allows for the interchangeability of cards. Further, even though a plurality of cards are necessary, each card when installed performs the logic for the particular function and replacement of one card renders a malfunctioning subsystem operative without troubleshooting a plurality of remotely located functional logic cards with their multiple interconnections.

Since the card for the particular function has a set of known input conditions [i.e. 0 or 1 binary inputs], a check on the particular input will reveal whether or not the card is receiving the proper signal. In this way a malfunction in the system can be traced to the card involved and thereafter traced further to defective connections or a similarly defective input card. This eliminates tracing the malfunction through a plurality of functional logic cards. A defect in the system reveals itself in a functional manner, whereas with distributed functional logic the defects are revealed in a less readily perceivable manner.

For example, if a burner were tripped out due to a defective burner shut down card, that component could easily be replaced almost instantly. If the card were not defective, a quick check of I/O would reveal this. Such a check would lead to either a bad connection or a related card.

With distributed functional logic, the necessary trouble shooting steps would be more cumbersome because elements of the circuitry performing one function would be distributed on a plurality of cards. Malfunctions would be more difficult to trace and involve other subsystems because the removal of a card might affect several subsystems having components in the affected card. In the present system a malfunction can be more readily to a single subsystem.

While there has been described what at present is considered to be the preferred embodiment of the present invention, it should be obvious to those skilled in the art that certain changes and modifications may be made therein without departing from the invention, and it is intended in the appended claims to cover all such modifications as fall within the true spirit and scope of the invention.

What is claimed is:

1. A burner control apparatus for controlling fuel burner systems for firing furnace sections of steam generators in accordance with any one of a plurality of operational specifications for predetermined general system functions including, a master section, a burner section and an annunciator section each having individual sequences comprising:
   a plurality of sets of logical function means having inputs and outputs, responsive to selected ones of the parameters of the system for producing output control and indication signals respectively,
   each logical function means including one solid state control circuit card for performing each logical function in accordance with the operational specification such as fuel trip, burner ignition, shutdown, and each card fabricated to include functional logic circuits of the AND, OR, NAND, NOR, type, adapted to perform each of the various individual logic steps relating to standardized logic sequences associated with fuel burner systems, when each of said logical function means is selectively interconnected with the other ones of said logical function means in the burner system in a selected manner, such that the system provides multiple interchangeability of said logical function cards in accordance with the selected interconnections, whereby the vapor generator is capable of being controlled in accordance with standardized logic sequences and specific logic sequence requirements.

2. Apparatus as described in claim 1 wherein the master section comprises:
   master control means interconnected with each of the burner sections for detecting parameters relating to the furnace as a whole including:
   fuel safety means for detecting the occurrence of any one of a plurality of preselected system conditions requiring a complete shutdown of all fuel to the furnace and producing an operative output therefor referred to as a master fuel trip MFT;
   purge means for initiating a sequence of outputs when activated, for purging the furnace of combustible mixtures of fuel and oxygen prior to ignition of any fuel,
   prelight means for establishing a sequence of outputs when activated, operative to establish reset conditions for delivery of any fuel to the furnace, each of the aforemen-tioned means being fabricated from at least one printed circuit card and each arranged with solid state elements.

3. Apparatus of claim 2 wherein said fuel safety means includes an MFT card responsive to selected inputs requiring an MFT; and MFT relay means for controlling all fuel to the furnace in response to a trip output of said MFT card, said MFT relay initiating a shutdown of fuel when tripped into a first condition and establishing at least one permissive for the delivery of fuel to the furnace when reset to a second condition.

4. Apparatus of claim 3 including MFT manual switch means for producing an output when activated, outputs of said purge, prelight and manual means being operatively coupled to said MFT card for resetting said MFT relay to said second condition, the occurrence or any one of said pre-established system conditions initiating said MFT output from the card for tripping said MFT relay to said first condition.

5. Apparatus of claim 4 wherein a secondary path is provided for said MFT card output to disable the reset of said MFT relay if any one of said conditions exist in spite of the existence of said outputs of said purge, prelight, and manual switch means.

6. Apparatus of claim 2 wherein said purge means includes:
a purge card responsive when activated to produce the purge output;
purge manual switch means producing an output when activated and
lock-in logic circuit means for said purge card responsive to said purge manual switch means and said MFT card output for activating the purge card and initiating the furnace purge, said lock-in means further responsive to selected purge system conditions for producing an output operative for disengaging the lock-in means upon the occurrence of any one thereof, and
a timer for controlling the purge card output signal for a selected period when activated.

7. Apparatus of claim 6 wherein said purge card means includes: secondary logic means for disengaging the purge means upon the occurrence of system conditions less critical than the aforementioned purge system conditions, said secondary means being coupled to said timer producing a control signal thereto for disabling the purge card output if any of the secondary purge conditions exist.

8. Apparatus of claim 7 wherein said purge card means is disengaged by the occurrence of any one of the purge system conditions, the timer and lock-in means operatively coupled to the purge system output and being reset, thereby requiring a reactuation of the purge means by the removal of the condition causing the output and the actuation of the manual switch means, and further including means responsive to any of the secondary conditions such that the timer is reset upon the removal of the condition causing the secondary condition such that the timer is re-enabled for the full period of the time.

9. Apparatus of claim 2 wherein said prelight means includes: prelight card means for producing a prelight output;
ignitor fuel trip, IFT relay means responsive to the prelight card being operative to produce an output for enabling ignitor fuel to be delivered to the ignitors, and said prelight card is responsive when activated by any one of a plurality of selected conditions for producing an IFT output to drive the IFT relay to a condition for disabling said delivery of ignitor fuel.

10. Apparatus of claim 9 wherein said prelight means includes: ignitor manual switch means for producing an input for said prelight card when actuated to enable the reset of said IFT relay.

11. Apparatus as described in claim 10 wherein said prelight card includes: a redundant path for said IFT output for disabling the reset of said IFT relay.

12. Apparatus of claim 2 including: burner operation control means associated with each one of the furnace burners communicating therewith and with said master control means for controlling and being responsive to individual conditions associated with each burner.

13. Apparatus of claim 12 including:
burner prelight card means for each individual burner for producing an output to enable the delivery of fuel to the individual burner;
ignitor lightoff card means responsive to inputs from the fuel safety means, the purge means, and the IFT prelight means for producing and enabling signal for lighting an individual ignitor associated with the individual burner;
shutdown card means for producing a signal to cut off fuel to an individual burner;
burner lightoff card means for producing start-up signal for the particular burner;
burner fuel trip card means responsive to selected burner conditions for producing a fuel trip output for the particular burner upon the occurrence thereof;
each of said cards being responsive to outputs from the master control means and the fuel trip card output associated with the burner for selectively enabling and disabling the means associated with the individual burner.

14. Apparatus of claim 13 wherein, a fuel trip relay, operatively responsive to the burner prelight card, enables the delivery of fuel to the individual burner when reset to a first condition by said card output and disables burner fuel delivery when tripped to a second condition thereby;
burner manual switch means provides an input for said card operable to reset said fuel trip relay to said first condition when said manual means is actuated, and logic circuit means of said card produces an output actuating said relay to said second condition upon the occurrence of said fuel trip condition.

15. Apparatus of claim 14 including: indicator means for producing an indication communicating a permission to light fuel for the individual burners, said indication means being responsive to said fuel trip card output to disable said permission indication.

16. Apparatus of claim 15 including: redundant means for cutting off fuel to said individual burner in response to the fuel trip card output including the MFT card output and actuation of said burner manual switch means to an OFF condition.

17. Apparatus of claim 13 including: energizing means responsive to the ignitor lightoff card output for lighting an ignitor associated with the particular burner when energized, said card including logic enabling means responsive to a plurality of ignitor permissive conditions including the signal indication for a permission to light the ignitor for producing a permissive output,
a time delay means actuated in response to the ignitor permissive output produces an input for said lightoff card for establishing a period in which the ignitor must be placed into service,
flame detector card responsive to a flame detector output produced when the ignitor is placed into service by said ignitor lightoff card output for providing a signal indicative thereof, and
logic circuit means on said lightoff card responsive to the timer means and the flame detector card output for disabling said lightoff card permissive output for initiating an ignitor shutdown if the ignitor is not in service within said time period.

18. Apparatus of claim 17 including:
burner valve operator card means operable to deliver a signal to the associated burner valve to permit flow of fuel to the burner in response to a signal indicative of the associated ignitor being in service, manual switch means delivering an input to said burner valve operator card for actuating the particular burner valve to an ON condition, and enabling logic circuit means on said burner valve operator card provided to enable the particular burner to go into service in response to the ignitor permissive output; and a burner flame detector card associated with the burner for detecting the ignition of a burner upon the opening of said burner valve.

19. Apparatus of claim 18 including:

means for closing said burner valve, said shutdown card means responsive to occurrence of any of a plurality of burner shutdown conditions including manual switch means for providing a burner shutdown card output, and time delay means for detecting the burner valve condition and producing an alarm indicative of an unsuccessful burner shutdown if the burner valve fails to close within said time period.

20. Apparatus of claim 13 wherein said burner is a fuel oil burner and the control means therefor includes:

oil gun purge card means for producing a purge output requiring an oil gun purge when actuated.

21. Apparatus of claim 20 including: oil gun purge valve means opened in response to said purge output, and logic circuit means for said oil gun purge card is responsive for producing said card output upon a signal indicative of an ignitor in service for the selected burner for burning off noncombusted oil of said oil gun.

22. Apparatus of claim 21 wherein:

time delay means is responsive to the opening of the oil gun purge valve, and pressure card means detects the oil pressure of said oil gun and provides indication if the purge pressure reaches a selected minimum within said time delay; and said oil gun purge card means responsive to said indication includes logic time set means for producing an output for enabling the oil gun purge for a selected interval.

23. Apparatus of claim 13 wherein said burner control means includes:

air register card means producing an output for controlling the opening and closing of air registers or dampers;

manual switch means and selected air register condition responsive means produce inputs for the card to generate open and close signals for operating the air registers in response to the preselected system parameters.

24. Apparatus of claim 13 including:

executive means for controlling automatically the number of burners in service at a particular time in accordance with an operating range for the boiler, including manual switch means, a detector card responsive to a plurality of selected conditions for producing a first output to disable one burner at a time in a group of available burners in service and a second output for enabling one burner at a time in a group available to go into service, said detector card responsive to the shutdown and lightoff of the particular burner, and a selector card responsive to the detector output for continually successively shuttingdown and lighting off burners sequentially, said detector card responsive to the condition of a burner such that the selector card may respectively select a burner not already in service to be placed in service and may select a burner in service to be shutdown successively, whereby the automatic control system maintains a number of burners in service at any one time, so that extremes of the boiler operation are not exceeded at any one time.

25. Apparatus of claim 18 wherein said burner is an oil burner and said control system includes:

an oil recirculation card for producing an output to require recirculating of oil within the system; manual switch means produces an input for said card for initiating said recirculation of said fuel oil, said recirculation card means responsive to time delay means for establishing a selected time sequence, said time delay means responsive to an open condition of any burner valve for closing the recirculation means if said oil valves are not detected closed within said time delay.

26. Apparatus of claim 2 further wherein the annunciator includes a card responsive to an associated input for detecting any one of a plurality of selected alarm conditions and displaying the status thereof said cards for detecting emergency conditions including, a loss of available power cards for any of the individual burner control systems, the master control system, and the annunciator means.

27. Apparatus of claim 26 wherein said annunciator means includes:

card means for detecting any fuel trip including;

a master fuel trip card, ignitor fuel trip card, and burner fuel trip card and display means therefor, and card means for detecting the loss of any flame for a burner or ignitor in service at a particular time, and indication means therefor.

28. Apparatus of claim 27 including:

means responsive to the associated card output for producing burner and ignitor trouble alarms in response to any unsuccessful burner or ignitor shutdown.

29. Apparatus of claim 22 including;

card means responsive to the output producing blockage alarm for the oil gun purge and indication therefor.

30. Apparatus of claim 1 wherein each logical function means comprises: a printed circuit card having selected ones of said functional logic circuits mounted thereon, each logical function card capable of receiving a plurality of inputs on terminals therefor and producing various outputs in response to said inputs indigenous to the logical function performed thereby, the card for each logical function being selectively capable of expansion or contraction of inputs by means of selective coupling of the inputs to other logical functional means.

31. The apparatus of claim 1 wherein the fuels are fossil fuels selected for the group consisting of oil, gas and coal.

* * * * *